(12) United States Patent
Gray et al.

(10) Patent No.: US 10,175,988 B2
(45) Date of Patent: Jan. 8, 2019

(54) EXPLICIT INSTRUCTION SCHEDULER STATE INFORMATION FOR A PROCESSOR

(71) Applicant: Microsoft Technology Licensing, LLC, Redmond, WA (US)

(72) Inventors: Jan Gray, Bellevue, WA (US); Doug Burger, Bellevue, WA (US); Aaron Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 14/752,797

(22) Filed: Jun. 26, 2015

(65) Prior Publication Data
US 2016/0378496 A1      Dec. 29, 2016

(51) Int. Cl.
*G06F 9/38*      (2018.01)
*G06F 8/41*      (2018.01)

(52) U.S. Cl.
CPC .............. *G06F 9/3836* (2013.01); *G06F 8/41* (2013.01); *G06F 9/38* (2013.01); *G06F 9/3802* (2013.01); *G06F 9/3814* (2013.01)

(58) Field of Classification Search
CPC .......... G06F 9/32; G06F 15/80; G06F 9/3005; G06F 9/3842; G06F 9/3822; G06F 9/3836; G06F 9/30054; G06F 9/3804; G06F 9/3846; G06F 9/3859; G06F 9/3891; G06F 9/3808; G06F 9/382; G06F 9/3838
USPC ...................................................... 712/214
See application file for complete search history.

(56) References Cited

U.S. PATENT DOCUMENTS

| | | |
|---|---|---|
| 5,142,631 A | 8/1992 | Murray et al. |
| 5,333,280 A | 7/1994 | Ishikawa et al. |
| 5,333,283 A | 7/1994 | Emma et al. |
| 5,363,495 A | 11/1994 | Fry et al. |
| 5,615,350 A | 3/1997 | Hesson et al. |
| 5,790,822 A | 8/1998 | Sheaffer et al. |
| 5,796,997 A | 8/1998 | Lesartre et al. |
| 5,799,167 A | 8/1998 | Lesartre |
| 5,845,102 A | 12/1998 | Miller et al. |
| 5,845,103 A | 12/1998 | Sodani et al. |

(Continued)

FOREIGN PATENT DOCUMENTS

| | | |
|---|---|---|
| CN | 101344843 A | 1/2009 |
| CN | 102096579 A | 6/2011 |

(Continued)

OTHER PUBLICATIONS

Burger, D et al. Design and Implementation of the TRIPS EDGE Architecture. Jun. 4, 2005. Retrieved from the Internet <URL: https://www.cs.utexas.edu/~trips/talks/trips_tutorial_6up.pdf>.*

(Continued)

*Primary Examiner* — Aimee Li
*Assistant Examiner* — Shawn Doman
(74) *Attorney, Agent, or Firm* — Ranjeev Singh; Singh Law, PLLC (57) ABSTRACT

A method including fetching a group of instructions, where the group of instructions is configured to execute atomically by a processor, is provided. The method further includes scheduling at least one of the group of instructions for execution by the processor before decoding the at least one of the group of instructions based at least on pre-computed ready state information associated with the at least one of the group of instructions.

20 Claims, 3 Drawing Sheets

(56) References Cited

U.S. PATENT DOCUMENTS

| | | |
|---|---|---|
| 5,903,750 A | 5/1999 | Yeh et al. |
| 5,933,642 A | 8/1999 | Greenbaum et al. |
| 5,943,501 A | 8/1999 | Burger et al. |
| 5,983,337 A | 11/1999 | Mahalingaiah et al. |
| 5,999,737 A | 12/1999 | Srivastava |
| 6,016,399 A | 1/2000 | Chang |
| 6,044,222 A | 3/2000 | Simons et al. |
| 6,058,438 A | 5/2000 | Diehl et al. |
| 6,061,776 A | 5/2000 | Burger et al. |
| 6,112,019 A | 8/2000 | Chamdani et al. |
| 6,161,170 A | 12/2000 | Burger et al. |
| 6,164,841 A | 12/2000 | Mattson et al. |
| 6,167,491 A | 12/2000 | McAlpine |
| 6,185,675 B1 | 2/2001 | Kranich et al. |
| 6,212,622 B1 | 4/2001 | Witt |
| 6,275,919 B1 | 8/2001 | Johnson |
| 6,279,101 B1 | 8/2001 | Witt et al. |
| 6,286,135 B1 | 9/2001 | Santhanam |
| 6,301,673 B1 | 10/2001 | Foster et al. |
| 6,360,309 B1 | 3/2002 | Iadonato et al. |
| 6,453,344 B1 | 9/2002 | Ellsworth et al. |
| 6,493,820 B2 | 12/2002 | Akkary et al. |
| 6,513,109 B1 | 1/2003 | Gschwind et al. |
| 6,523,110 B1 | 2/2003 | Bright et al. |
| 6,529,922 B1 | 3/2003 | Hoge |
| 6,779,100 B1 | 8/2004 | Keltcher et al. |
| 6,851,043 B1 | 2/2005 | Inoue |
| 6,877,059 B2 | 4/2005 | Solomon et al. |
| 6,918,032 B1 | 7/2005 | Abdallah et al. |
| 6,934,254 B2 | 8/2005 | Brown et al. |
| 6,934,828 B2 | 8/2005 | Parthasarathy et al. |
| 6,957,320 B2 | 10/2005 | Senter et al. |
| 6,957,435 B2 | 10/2005 | Armstrong et al. |
| 6,965,969 B2 | 11/2005 | Burger et al. |
| 6,988,183 B1 | 1/2006 | Wong |
| 6,993,640 B2 | 1/2006 | Doing et al. |
| 6,996,698 B2 | 2/2006 | Slegel et al. |
| 7,032,217 B2 | 4/2006 | Wu |
| 7,036,036 B2 | 4/2006 | Vorbach et al. |
| 7,051,187 B2 | 5/2006 | Garg et al. |
| 7,051,188 B1 | 5/2006 | Kubala et al. |
| 7,069,555 B1 * | 6/2006 | Tzen .................... G06F 8/445 712/212 |
| 7,152,155 B2 | 12/2006 | McIlvaine et al. |
| 7,207,038 B2 | 4/2007 | Bicsak et al. |
| 7,210,127 B1 | 4/2007 | Rangachari |
| 7,228,402 B2 | 6/2007 | Rychlik et al. |
| 7,284,100 B2 | 10/2007 | Slegel et al. |
| 7,299,458 B2 | 11/2007 | Hammes |
| 7,308,320 B2 | 12/2007 | Miyamori |
| 7,310,722 B2 | 12/2007 | Moy et al. |
| 7,380,038 B2 | 5/2008 | Gray |
| 7,392,524 B2 | 6/2008 | Ault et al. |
| 7,453,899 B1 | 11/2008 | Vaida et al. |
| 7,490,224 B2 | 2/2009 | Abernathy et al. |
| 7,526,637 B2 | 4/2009 | Jung et al. |
| 7,571,284 B1 | 8/2009 | Olson et al. |
| 7,587,578 B2 | 9/2009 | Isobe |
| 7,624,254 B2 | 11/2009 | Smith et al. |
| 7,631,170 B2 | 12/2009 | Dowling |
| 7,664,940 B2 | 2/2010 | Conklin et al. |
| 7,676,650 B2 | 3/2010 | Ukai |
| 7,685,354 B1 | 3/2010 | Hetherington et al. |
| 7,720,991 B1 | 5/2010 | Parent et al. |
| 7,779,213 B2 | 8/2010 | Ferren et al. |
| 7,802,073 B1 | 9/2010 | Cheng et al. |
| 7,805,574 B2 | 9/2010 | Bell et al. |
| 7,853,777 B2 | 12/2010 | Jones et al. |
| 7,873,776 B2 | 1/2011 | Hetherington et al. |
| 7,877,580 B2 | 1/2011 | Eickemeyer et al. |
| 7,877,586 B2 | 1/2011 | Levitan et al. |
| 7,917,733 B2 | 3/2011 | Kazuma |
| 7,958,396 B2 | 6/2011 | Chitsaz et al. |
| 8,010,953 B2 | 8/2011 | Gschwind |
| 8,032,734 B2 | 10/2011 | Svendsen et al. |
| 8,055,881 B2 | 11/2011 | Burger et al. |
| 8,055,885 B2 | 11/2011 | Nakashima |
| 8,127,119 B2 | 2/2012 | Burger et al. |
| 8,151,092 B2 | 4/2012 | Altman et al. |
| 8,166,282 B2 | 4/2012 | Madriles et al. |
| 8,180,997 B2 | 5/2012 | Burger et al. |
| 8,201,024 B2 | 6/2012 | Burger et al. |
| 8,225,315 B1 | 7/2012 | Cheng et al. |
| 8,234,635 B2 | 7/2012 | Isshiki et al. |
| 8,250,555 B1 | 8/2012 | Lee et al. |
| 8,250,556 B1 | 8/2012 | Lee et al. |
| 8,266,413 B2 | 9/2012 | Hwu et al. |
| 8,290,994 B2 | 10/2012 | Allalouf et al. |
| 8,321,850 B2 | 11/2012 | Bruening et al. |
| 8,341,639 B2 | 12/2012 | Lewis |
| 8,380,964 B2 | 2/2013 | Bishop et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,464,271 B2 | 6/2013 | Eichenberger et al. |
| 8,473,724 B1 | 6/2013 | Kenville et al. |
| 8,510,596 B1 | 8/2013 | Gupta et al. |
| 8,533,436 B2 | 9/2013 | Fryman et al. |
| 8,555,038 B2 | 10/2013 | Olson et al. |
| 8,589,662 B2 | 11/2013 | Altman et al. |
| 8,589,892 B2 | 11/2013 | Fournier et al. |
| 8,612,698 B2 | 12/2013 | Lopez et al. |
| 8,612,726 B2 | 12/2013 | Sharawi et al. |
| 8,677,105 B2 | 3/2014 | Abdallah |
| 8,756,605 B2 | 6/2014 | Aingaran et al. |
| 8,817,793 B2 | 8/2014 | Mushano |
| 8,909,941 B1 | 12/2014 | Trimberger |
| 8,930,678 B2 | 1/2015 | Madduri et al. |
| 9,021,241 B2 | 4/2015 | Burger et al. |
| 9,043,769 B2 | 5/2015 | Vorbach |
| 9,053,292 B2 | 6/2015 | Abdallah |
| 9,720,693 B2 | 8/2017 | Burger et al. |
| 9,946,548 B2 | 4/2018 | Burger et al. |
| 9,952,867 B2 | 4/2018 | Burger et al. |
| 2003/0004683 A1 | 1/2003 | Nemawarkar |
| 2003/0012225 A1 | 1/2003 | Banerjee et al. |
| 2003/0065835 A1 | 4/2003 | Maergner et al. |
| 2003/0101208 A1 | 5/2003 | Chauvel et al. |
| 2003/0149862 A1 | 8/2003 | Kadambi |
| 2004/0123078 A1 | 6/2004 | Hum et al. |
| 2004/0139299 A1 | 7/2004 | Busaba et al. |
| 2005/0076194 A1 | 4/2005 | Kanapathippillai et al. |
| 2006/0020769 A1 | 1/2006 | Herrell et al. |
| 2006/0020944 A1 | 1/2006 | King et al. |
| 2006/0031702 A1 | 2/2006 | Jardine et al. |
| 2006/0041875 A1 | 2/2006 | Peri et al. |
| 2006/0075207 A1 | 4/2006 | Togawa et al. |
| 2006/0136915 A1 * | 6/2006 | Aingaran ............. G06F 9/3842 718/100 |
| 2006/0259739 A1 | 11/2006 | Asal et al. |
| 2006/0259740 A1 | 11/2006 | Hahn et al. |
| 2006/0282624 A1 | 12/2006 | Yokota |
| 2007/0050557 A1 | 3/2007 | Ferren et al. |
| 2007/0055827 A1 | 3/2007 | Tsien |
| 2007/0074011 A1 | 3/2007 | Borkar et al. |
| 2007/0113171 A1 | 5/2007 | Behrens et al. |
| 2007/0157006 A1 | 7/2007 | Jourdan et al. |
| 2007/0162906 A1 | 7/2007 | Chandhoke |
| 2007/0192540 A1 | 8/2007 | Gara et al. |
| 2007/0239965 A1 | 10/2007 | Lewites et al. |
| 2007/0255980 A1 | 11/2007 | Endo et al. |
| 2008/0046621 A1 | 2/2008 | Okino et al. |
| 2008/0109668 A1 | 5/2008 | Atkinson |
| 2008/0126750 A1 | 5/2008 | Sistla |
| 2008/0192050 A1 | 8/2008 | Schardt et al. |
| 2008/0235493 A1 | 9/2008 | Fortier |
| 2008/0235499 A1 | 9/2008 | Togawa |
| 2008/0244506 A1 | 10/2008 | Killian et al. |
| 2008/0250227 A1 | 10/2008 | Linderman et al. |
| 2009/0013135 A1 | 1/2009 | Burger et al. |
| 2009/0013153 A1 | 1/2009 | Hilton |
| 2009/0013160 A1 | 1/2009 | Burger et al. |
| 2009/0150657 A1 | 6/2009 | Gschwind et al. |

(56) References Cited

U.S. PATENT DOCUMENTS

| | | |
|---|---|---|
| 2009/0172365 A1 | 7/2009 | Orenstien et al. |
| 2009/0177843 A1 | 7/2009 | Wallach et al. |
| 2009/0187739 A1 | 7/2009 | Nemirovsky et al. |
| 2009/0299966 A1 | 12/2009 | Schneider |
| 2010/0070958 A1 | 3/2010 | Takagi |
| 2010/0082947 A1 | 4/2010 | Tramm et al. |
| 2010/0146209 A1 | 6/2010 | Burger et al. |
| 2010/0262807 A1 | 10/2010 | Burky et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0219222 A1 | 9/2011 | Eichenberger et al. |
| 2011/0238953 A1 | 9/2011 | Metsugi et al. |
| 2011/0252258 A1 | 10/2011 | Im et al. |
| 2012/0030451 A1 | 2/2012 | Pong et al. |
| 2012/0079102 A1 | 3/2012 | Damodaran et al. |
| 2012/0124345 A1 | 5/2012 | Denman et al. |
| 2012/0131309 A1 | 5/2012 | Johnson et al. |
| 2012/0216012 A1 | 8/2012 | Vorbach et al. |
| 2012/0246448 A1 | 9/2012 | Abdallah |
| 2012/0246450 A1 | 9/2012 | Abdallah |
| 2012/0303933 A1 | 11/2012 | Manet et al. |
| 2012/0311306 A1 | 12/2012 | Mushano |
| 2013/0024676 A1 | 1/2013 | Glew et al. |
| 2013/0046954 A1 | 2/2013 | Ruehle et al. |
| 2013/0191817 A1 | 7/2013 | Vorbach |
| 2013/0198499 A1 | 8/2013 | Dice et al. |
| 2013/0339470 A1 | 12/2013 | Jeswani et al. |
| 2014/0033217 A1 | 1/2014 | Vajda et al. |
| 2014/0082327 A1 | 3/2014 | Ghose |
| 2014/0095837 A1 | 4/2014 | Plotnikov et al. |
| 2014/0136822 A1 | 5/2014 | Suggs et al. |
| 2014/0173222 A1 | 6/2014 | Alapati et al. |
| 2014/0173262 A1 | 6/2014 | Chheda et al. |
| 2014/0181475 A1 | 6/2014 | Abdallah |
| 2014/0189287 A1 | 7/2014 | Plotnikov et al. |
| 2014/0195787 A1 | 7/2014 | Scalabrino et al. |
| 2014/0201507 A1 | 7/2014 | Jayaseelan et al. |
| 2014/0281389 A1 | 9/2014 | Loktyukhin et al. |
| 2014/0281416 A1 | 9/2014 | Abdallah |
| 2014/0281424 A1 | 9/2014 | Bobba et al. |
| 2014/0281434 A1 | 9/2014 | Madriles et al. |
| 2014/0281622 A1 | 9/2014 | Wagh et al. |
| 2014/0282607 A1 | 9/2014 | O'sullivan et al. |
| 2014/0298336 A1 | 10/2014 | Taniuchi |
| 2014/0317387 A1 | 10/2014 | Abdallah |
| 2014/0331236 A1 | 11/2014 | Mitra et al. |
| 2014/0351524 A1 | 11/2014 | Natarajan et al. |
| 2014/0372736 A1 | 12/2014 | Greenhalgh |
| 2014/0373022 A1 | 12/2014 | Chan |
| 2015/0019921 A1 | 1/2015 | Chen et al. |
| 2015/0067214 A1 | 3/2015 | Henry et al. |
| 2015/0067662 A1 | 3/2015 | Palalau |
| 2015/0074355 A1 | 3/2015 | Sampathkumar et al. |
| 2015/0095628 A1 | 4/2015 | Yamada et al. |
| 2015/0100757 A1 | 4/2015 | Burger et al. |
| 2015/0127928 A1* | 5/2015 | Burger .................. G06F 9/3836 712/229 |
| 2015/0199199 A1 | 7/2015 | Burger et al. |
| 2015/0199272 A1 | 7/2015 | Goel et al. |
| 2016/0055004 A1 | 2/2016 | Grochowski et al. |
| 2016/0179546 A1 | 6/2016 | Yamada et al. |
| 2016/0328237 A1* | 11/2016 | Di .................. G06F 9/3834 |
| 2016/0378479 A1 | 12/2016 | Burger et al. |
| 2016/0378483 A1 | 12/2016 | Burger et al. |
| 2016/0378484 A1 | 12/2016 | Burger et al. |
| 2016/0378488 A1 | 12/2016 | Burger et al. |
| 2016/0378491 A1 | 12/2016 | Burger et al. |
| 2016/0378499 A1 | 12/2016 | Burger et al. |
| 2016/0378502 A1 | 12/2016 | Burger et al. |
| 2016/0378661 A1 | 12/2016 | Gray et al. |
| 2017/0083343 A1 | 3/2017 | Burger |

FOREIGN PATENT DOCUMENTS

| | | |
|---|---|---|
| CN | 102306094 A | 1/2012 |
| CN | 104310225 A | 1/2015 |
| EP | 0583089 A2 | 2/1994 |
| EP | 0992894 A1 | 4/2000 |
| EP | 1039374 A2 | 9/2000 |
| EP | 1102163 A2 | 5/2001 |
| EP | 2527972 A2 | 11/2012 |
| WO | 0125903 A1 | 4/2001 |
| WO | 2004001587 A2 | 12/2003 |
| WO | 2006102664 A2 | 9/2006 |
| WO | 2009006607 A1 | 1/2009 |
| WO | 2011031361 A1 | 3/2011 |
| WO | 2013081556 A1 | 6/2013 |
| WO | 2013095635 A1 | 6/2013 |
| WO | 2014014216 A1 | 1/2014 |
| WO | 2014193878 A1 | 12/2014 |
| WO | 2015069583 A1 | 5/2015 |

OTHER PUBLICATIONS

"International Search Report and Written Opinion Issued in PCT Application No. PCT/US2016/038842", dated Oct. 6, 2016, 11 Pages.

Putnam, et al., "Dynamic Vectorization in the E2 Dynamic Multicore Architecture", In Proceedings of 1st International Workshop on Highly-Efficient Accelerators and Reconfigurable Technologies, Jun. 2010, 6 pages.

Sankaralingam, et al., "Distributed Microarchitectural Protocols in the TRIPS Prototype Processor", In Proceedings of 39th Annual IEEE/ACM International Symposium on Microarchitecture, Dec. 9, 2006, 12 pages.

Burger, et al., "Scaling to the End of Silicon with EDGE Architectures", In Proceedings of Computer, vol. 37, Issue 7, Jul. 2004, pp. 44-55.

Smith, et al., "Compiling for EDGE Architectures", In Proceedings of the 4th International Symposium on Code Generation and Optimization, Mar. 26, 2006, pp. 1-11.

Sankaralingam, et al., "TRIPS: A Polymorphous Architecture for Exploiting ILP, TLP, and DLP", In Proceedings of ACM Transactions on Architecture and Code Optimization, vol. 1, No. 1, Mar. 2004, pp. 62-93.

Smith, Aaron Lee, "Explicit Data Graph Compilation", In Doctoral Dissertation, Dec. 2009, 3 pages.

Gray, Jan, et al., "Towards an Area-Efficient Implementation of a High ILP EDGE Soft Processor: Comparing Out-of-Order Dataflow Instruction Scheduler Designs", 1 page.

Sibi, et al., "Scaling Power and Performance via Processor Composability", In Technical Report No. TR-10-14, Department of Computer Sciences, 2010, 20 Pages.

Smith, et al., "Dataflow Predication", In Proceedings of the 39th Annual IEEE/ACM International Symposium on Microarchitecture, Dec. 9, 2006, 12 Pages.

Smith, et al., "TRIPS Application Binary Interface (ABI) Manual", In Technical Report TR-05-22, Department of Computer Sciences, Oct. 10, 2006, 16 Pages.

Sohi, et al., "Multiscalar Processors", In Proceedings of 22nd Annual International Symposium on Computer Architecture, Jun. 22, 1995, 12 Pages.

Sohi, Gurindar, "Retrospective: Multiscalar Processors", In Proceedings of the 25th Annual International Symposium on Computer Architectures, Jun. 27, 1998, pp. 1111-1114.

Souza, et al., "Dynamically Scheduling VLIW Instructions", In Journal of Parallel and Distributed Computing, vol. 60,, Jul. 2000, pp. 1480-1511.

Tamches, et al., "Dynamic Kernel Code Optimization", In Workshop on Binary Translation, Sep. 2001, 10 Pages.

Uhlig, Richard Albert, "Trap-driven Memory Simulation", In Doctoral Dissertation of Ph.D, Aug. 1995, 203 Pages.

Uhrig, et al., "The Two-dimensional Superscalar GAP Processor Architecture", In International Journal on Advances in Systems and Measurements, vol. 3, No. 1 & 2, Oct. 2010, pp. 71-81.

(56) References Cited

OTHER PUBLICATIONS

Valentine, Bob, "Introducing Sandy Bridge", Retrieved from <<https://cesga.es/en/paginas/descargaDocumento/id/135>>, Retrieved Date: Aug. 24, 2015, 54 Pages.
Wilhelm, Reinhard, "Determining Bounds on Execution Times", In Proceedings of Embedded Systems Design and Verification, vol. 1, Aug. 16, 2005, 33 Pages.
Wong, et al., "Efficient Methods for Out-of-Order Load/Store Execution for High-Performance soft Processors", In Proceedings of International Conference on Field-Programmable Technology, Dec. 9, 2013, pp. 442-445.
Wu, et al., "Block Based Fetch Engine for Superscalar Processors", In Proceedings of the 15th International Conference on Computer Applications in Industry and Engineering, Nov. 7, 2002, 4 Pages.
"Second Written Opinion Issued in PCT Application No. PCT/US2016/038842", dated May 30, 2017, 5 pages.
Nagarajan, et al., "Critical Path Analysis of the TRIPS Architecture", In IEEE International Symposium on Performance Analysis of Systems and Software, Mar. 19, 2006, 11 Pages.
Nagarajan, et al., "Static Placement, Dynamic Issue (SPDI) Scheduling for EDGE Architectures", In Proceedings of the 13th International Conference on Parallel Architectures and Compilation Techniques, Sep. 29, 2004, 11 Pages.
Nethercote, et al., "Self-Evaluating Compilation Applied to Loop Unrolling", In Technical Report of the University of Texas at Austin, Report No. TR-06, Feb. 2006, 17 Pages.
Park, et al., "Polymorphic Pipeline Array: A Flexible Multicore Accelerator with Virtualized Execution for Mobile Multimedia Applications", In Proceedings of the 42nd Annual IEEE/ACM International Symposium on Microarchitecture, Dec. 12, 2009, pp. 370-380.
Park, et al., "Reducing Design Complexity of the Load/Store Queue", In Proceedings of the 36th annual IEEE/ ACM International Symposium on Microarchitecture, Dec. 3, 2003, 12 Pages.
"International Preliminary Report on Patentability Issued in PCT Patent Application No. PCT/US2014/039654", dated Aug. 17, 2015, 11 Pages.
"International Search Report & Written Opinion for PCT Patent Application No. PCT/US2014/039654", dated Aug. 26, 2014, 13 Pages.
Zmily, et al., "Block-Aware Instruction Set Architecture", In Proceedings of ACM Transactions on Architecture and Code Optimization, vol. 3, Issue 3, Sep. 2006, pp. 327-357.
"Second Written Opinion Issued in PCT Patent Application No. PCT/US2014/039654", dated Mar. 3, 2015, 7 Pages.
"International Search Report and Written Opinion Issued in PCT Application No. PCT/US2016/038843", dated Oct. 10, 2016, 11 Pages.
"International Search Report and Written Opinion Issued in PCT Application No. PCT/US2016/038845", dated Sep. 30, 2016, 14 Pages.
"International Search Report and Written Opinion Issued in PCT Application No. PCT/US2016/038846", dated Oct. 6, 2016, 11 Pages.
"Second Written Opinion issued in PCT Application No. PCT/US2016/038846", dated Apr. 7, 2017, 5 Pages.
"International Search Report and Written Opinion Issued in PCT Application No. PCT/US2016/038847", dated Nov. 9, 2016, 10 Pages.
"Second Written Opinion Issued in PCT Application No. PCT/US2016/038847", dated May 30, 2017, 4 Pages.
"International Search Report and Written Opinion Issued in PCT Application No. PCT/US2016/038848", dated Oct. 15, 2016, 11 Pages.
"International Search Report and Written Opinion Issued in PCT Application No. PCT/US2016/038849", dated Sep. 30, 2016, 15 Pages.
"International Search Report and Written Opinion Issued in PCT Application No. PCT/US2016/038850", dated Sep. 22, 2016, 12 Pages.
"International Search Report and Written Opinion Issued in PCT Application No. PCT/US2016/038851", dated Sep. 27, 2016, 11 Pages.
"International Search Report and Written Opinion Issued in PCT Application No. PCT/US2016/038852", dated Sep. 23, 2016, 14 Pages.
"Second Written Opinion Issued in PCT Application No. PCT/US2016/038852", dated May 24, 2017, 5 Pages.
"International Search Report and Written Opinion Issued in PCT Application No. PCT/US2016/038853", dated Sep. 22, 2016, 15 Pages.
"Second Written Opinion Issued in PCT Application No. PCT/US2016/038853", dated May 24, 2017, 6 Pages.
"International Search Report and Written Opinion Issued in PCT Application No. PCT/US2016/038854", dated Sep. 22, 2016, 13 Pages.
"International Search Report and Written Opinion Issued in PCT Application No. PCT/US2016/038855", dated Sep. 27, 2016, 13 Pages.
"Second Written Opinion Issued in PCT Application No. PCT/US2016/038855", dated May 18, 2017, 8 Pages.
"International Search Report and Written Opinion Issued in PCT Application No. PCT/US2016/051209", dated Dec. 16, 2016, 10 Pages.
"International Search Report and Written Opinion Issued in PCT Application No. PCT/US2016/051413", dated Jan. 2, 2017, 16 Pages.
"International Search Report and Written Opinion Issued in PCT Application No. PCT/US2016/051417", dated Dec. 15, 2016, 10 Pages.
Pengfei, et al., "M5 Based EDGE Architecture Modeling", In IEEE International Conference on Computer Design, Oct. 3, 2010, pp. 289-296.
Peon, et al., "HPACK—Header Compression for HTTP/2", In HTTP bis Working Group, Internet-Draft, Intended status: Standards Track, Jul. 31, 2014, 114 Pages.
Pericas, et al., "A Decoupled KILO—Instruction Processor", In the Twelfth International Symposium on High-Performance Computer Architecture, Feb. 11, 2006, 12 Pages.
Pericas, et al., "A Two-Level Load/Store Queue Based on Execution Locality", In Proceedings of 35th International Symposium on Computer Architecture, Jun. 21, 2008, 12 Pages.
Pickett, Christopher John Francis., "Software Method Level Speculation for Java", In Thesis Submitted to Mcgill University in Partial Fulfillment of the Requirement of the Degree of Doctor of Philosophy, Apr. 2012, 236 Pages.
Pierce, et al., "Wrong-Path Instruction Prefetching", In Proceedings of the 29th Annual IEEE/ ACM International Symposium on Microarchitecture, Dec. 2, 1996, 17 Pages.
Pricopi, Minai, et al., "Bahurupi: A Polymorphic Heterogeneous Multi-Core Architecture", In the ACM Transactions on Architecture and Code Optimization , vol. 8, Issue 4, Jan. 1, 2012, pp. 1-22.
Xue, et al., "Partial Dead Code Elimination on Predicated Code Regions", In Journal of Software—Practice & Experience, vol. 36, Issue 15, Dec. 2006, pp. 1655-1686.
Rahman, Rezaur, "Intel® Xeon Phi Core Micro-Architecture", Retrieved from <<https://software.intel.com/en-us/articles/intel-xeon-phi-core-micro-architecture>>, May 31, 2013, 28 Pages.
Robatmili, Behnam, "Efficient Execution of Sequential Applications on Multicore systems", Dissertation Presented to the Faculty of the Graduate School of the University of Texas at Austin in Partial Fulfilment of the Requirements for the Degree of the Doctor of Philosophy, Aug. 2011, 198 Pages.
Robatmili, et al., "Exploiting Criticality to Reduce Bottlenecks in Distributed Uniprocessors", In 17th IEEE International Symposium on High-Performance Computer Architecture, Feb. 2011, 12 Pages.
Robatmili, et al., "How to Implement Effective Prediction and Forwarding for Fusable Dynamic Multicore Architectures", In Proceedings of IEEE 19th International Symposium on High Performance Computer Architecture, Feb. 23, 2013, 12 Pages.

(56) References Cited

OTHER PUBLICATIONS

Robatmili, et al., "Strategies for Mapping Dataflow Blocks to Distributed Hardware", In the proceedings of the 41st IEEE/ACM International Symposium on Microarchitecture, Nov. 8, 2008, pp 23-34.
Roesner, et al., "Counting Dependence Predictors", In Undergraduate Honors Thesis, May 2, 2008, 25 Pages.
Sankaralingam, et al., "Exploiting ILP, TLP, and DLP with Polymorphous TRIPS Architecture", In Proceedings of 30th Annual International Symposium on Computer Architecture, Jun. 9, 2003, 12 Pages.
Sankaralingam, Karthikeyan, "Polymorphous Architectures: A Unified Approach for Extracting Concurrency of Different Granularities", In Doctoral Dissertation of Philosophy, Aug. 2007, 276 Pages.
Saravana, et al., "TRIPS: A Distributed Explicit Data Graph Execution (EDGE) Microprocessor", In Proceedings of IEEE Symposium on Hot Chips 19, Aug. 19, 2007, 13 Pages.
Sarkar, et al., "Understanding POWER Multiprocessors", In Proceedings of the 32nd ACM SIGPLAN Conference on Programming Language Design and Implementation, Jun. 4, 2011, pp. 175-186.
Sethumadhavan, et al., "Design and Implementation of the TRIPS Primary Memory System", In Proceedings of International Conference on Computer Design, ICCD, Oct. 1, 2006, 7 Pages.
Sethumadhavan, et al., "Late-Binding: Enabling Unordered Load-Store Queues", In Proceedings of the 34th Annual International Symposium on Computer Architecture, Jun. 9, 2007, pp. 347-357.
Dittmann, Gero, "On Instruction-Set Generation for Specialized Processors", In Dissertation Submitted to the Swiss Federal Institute of Technology Zurich for the Degree of Doctor of Technical Sciences, May 2005, 122 Pages.
Duong, et al., "Compiler-Assisted, Selective Out-of-Order Commit", In Journal of IEEE Computer Architecture Letters, vol. 12, Issue 1, Jan. 2013, 4 Pages.
Duric, et al., "Dynamic-Vector Execution on a General Purpose EDGE Chip Multiprocessor", In International Conference on Embedded Computer Systems: Architectures, Modeling, and Simulation, Jul. 14, 2014, pp. 18-25.
Duric, et al., "EVX: Vector Execution on Low Power EDGE Cores", In Proceedings of Conference on Design, Automation and Test in Europe Conference and Exhibition, Mar. 24, 2014, 4 Pages.
Duric, et al., "ReCompac: Reconfigurable Compute Accelerator", In International Conference on Reconfigurable Computing and FPGAs, Dec. 9, 2013, 4 Pages.
Essen, et al., "Energy-Efficient Specialization of Functional Units in a Coarse-Grained Reconfigurable Array", In Proceedings of the 19th ACM/SIGDA International Symposium on Field Programmable Gate Arrays, Feb. 27, 2011, 4 Pages.
Fallin, et al., "The Heterogeneous Block Architecture", In Proceedings of 32nd IEEE International Conference on Computer Design, Oct. 19, 2014, 8 Pages.
Gaudlot, et al., "The Sisal Model of Functional Programming and its Implementation", In Proceedings of Second Aizu International Symposium on Parallel Algorithms/Architectures Synthesis, Mar. 17, 1997, 12 Pages.
Gebhart, et al., "An Evaluation of the TRIPS Computer System", In the Proceedings of the 14th International Conference on Architecture Support for Programming Languages and Operating System, Mar. 7, 2009, 14 Pages.
Gonzalez, et al., "Dependence Speculative Multithreaded Architecture", In Technical Report, Retrieved on Jul. 1, 2015, 22 Pages.
Govindan, Madhu Sarava., "E3:Energy-Efficient EDGE Architectures", In Dissertation Presented to the Faculty of Graduate School of the university of Texas in Partial Fulfillment of the Requirements for the Degree of doctor of Philosophy, Aug. 2010, 244 Pages.
Govindan, et al., "Scaling Power and Performance via Processor Composability", In Journal, IEEE Transactions on Computers, vol. 63, Issue 8, Aug. 2014, 14 Pages.
Govindaraju, et al., "DySER: Unifying Functionality and Parallelism Specialization for Energy-Efficient Computing", In IEEE Micro, vol. 32, Issue 5, Jul. 10, 2012, pp. 38-51.
Gulati, et al., "Multitasking Workload Scheduling on Flexible Core Chip Multiprocessors", In Proceedings of International Conference on Parallel Architectures and Compilation Techniques, Oct. 25, 2008, 10 Pages.
Gupta, Anshuman, "Design Decisions for Tiled Architecture Memory Systems", Retrieved from <<https://pdfs.semanticscholar.org/9100/c6bbb1f56997b8cad6c1661ee1ce1aa90ee5.pdf>, Sep. 18, 2009, 14 Pages.
Gupta, et al., "Erasing Core Boundaries for Robust and Configurable Performance", In 43rd Annual IEEE/ACM International Symposium on Microarchitecture, Dec. 4, 2010, 12 Pages.
Hammond, et al., "Programming with Transactional Coherence and Consistency (TCC)", In ACM SIGOPS Operating Systems Review. vol. 38, Issue 5, Oct. 7, 2004, 13 Pages.
Hammond, et al., "Transactional Coherence and Consistency: Simplifying Parallel Hardware and Software", In IEEE computer Society, vol. 24, Issue 6, Nov. 2004, pp. 92-103.
Hammond, et al., "Transactional Memory Coherence and Consistency", In IEEE Computer Society of SIGARCH Computer Architecture News, vol. 32, Issue 2, Jun. 19, 2004, 12 Pages.
Hao, et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Hayes, et al., "Unified on-chip Memory Allocation for SIMT Architecture", In Proceedings of the 28th ACM international conference on Supercomputing, Jun. 10, 2014, pp. 293-302.
Hruska, Joel, "VISC CPU 'virtual core' design emerges: Could this be the conceptual computing breakthrough we've been waiting for?", Retrieved From <<https://www.extremetech.com/extreme/192858-visc-cpu-virtual-core-design-emerges-could-this-be-the-conceptual-breakthrough-weve-been-waiting-for>>, Oct. 24, 2014, 9 Pages.
Huang, et al., "Compiler-Assisted Sub-Block Reuse", In Proceedings of International Conference on Parallel Architectures and Compilation Techniques, May 1, 2000, 21 Pages.
Huang, Jian, "Improving Processor Performance Through Compiler-Assisted Block Reuse", A Dissertation Submitted in Partial Fulfillment of the Requirements for the Degree of Doctor of Philosophy, May 2000, 125 Pages.
Ipek, et al., "Core Fusion: Accommodating Software Diversity in Chip Multiprocessors", In Proceedings of the 34th Annual International Symposium on Computer Architecture, Jun. 9, 2007, 12 Pages.
Jhala, "Compiler Construction", In Proceedings of 22nd International Conference on Theory and Practice of Software, Mar. 16, 2013, 11 Pages.
Jones, et al., "A Comparison of Data Prefetching on an Access Decoupled and Superscalar Machine", In Proceedings of the Thirtieth Annual IEEE/ACM International Symposium on Microarchitecture, Dec. 3, 1997, 6 Pages.
Junier, et al., "Impact of Instruction Cache Replacement Policy on the Tightness of WCET Estimation", In Proceedings of the 2nd Junior Researcher Workshop on Real-Time Computing, in conjunction to RTNS, Oct. 16, 2008, 4 Pages.
Kamaraj, et al."Design of Out-of-Order Superscalar Processor with Speculative Thread Level Parallelism", In Proceedings of International Conference on Innovations in Engineering and Technology, Mar. 21, 2014, pp. 1473-1478.
Kane, "PA-RISC 2.0 Architecture", In Publication of Prentice Hall PTR, Retrieved on Sep. 17, 2015, 28 Pages.
Kavi, et al., "Concurrency, Synchronization, Speculation—the Dataflow Way", In Journal of Advances in Computers, vol. 96, Nov. 23, 2013, 41 Pages.
Keckler, et al., "Tera-Op Reliable Intelligently Adaptive Processing System (TRIPS)", In AFRL-IF-WP-TR-2004-1514 (Stinfo Final Report), Apr. 2004, 29 Pages.
Kim, et al., "Composable Lightweight Processors", In Proceedings of the 40th Annual IEEE/ACM International Symposium on Microarchitecture, Dec. 1, 2007, pp. 381-393.
Kinsy, et al., "Heracles: A Tool for Fast RTL-Based Design Space Exploration of Multicore Processors", In Proceedings of the ACM/

(56) References Cited

OTHER PUBLICATIONS

SIGDA International Symposium on Field Programmable Gate Arrays, Feb. 11, 2013, pp. 125-134.
Kocabas, et al., "Enhancing an Embedded Processor Core with a Cryptographic Unit for Performance and Security", In Proceedings of the 4th International Conference on Reconfigurable Computing and FPGAs, Dec. 3, 2008, pp. 409-414.
Kozumplik, et al., "TRIPS to the Semantic EDGE", Retrieved From <<https://web.archive.org/web/20150921054006/http://vbn.aau.dk/ws/files/61072300/1212050422.pdf>>, Sep. 22, 2015, 28 Pages.
Li et al. "Code Layout Optimization for Defensiveness and Politeness in Shared Cache", In 43rd International conference on Parallel Processing, Sep. 9, 2014, 11 Pages.
Li et al., "Compiler-Assisted Hybrid Operand Communication", In Technical Report of the University of Texas at Austin, Report No. TR-09-33, Nov. 1, 2009, 12 Pages.
Li, et al., "Hybrid Operand Communication for Dataflow Processors", In Workshop on Parallel Execution of Sequential Programs on Multi-core Architectures, Jun. 21, 2009, pp. 61-71.
Liu, Haiming, "Hardware Techniques to Improve Cache Efficiency", In Dissertation of the University of Texas at Austin, May 2009, 189 Pages.
Maher, Bertrand Allen., "Atomic Block Formation for Explicit Data Graph Execution Architectures", In Dissertation Presented to the Faculty of the Graduate School of The University of Texas at Austin in Partial Fulfillment of the Requirements for the Degree of Doctor of Philosophy, Aug. 2010, 185 Pages.
Maher, et al., "Merging Head and Tail Duplication for Convergent Hyperblock Formation", In Proceedings of the 39th Annual IEEE/ACM International Symposium on Microarchitecture, Dec. 9, 2006, 12 Pages.
Maher, et al., "The Good Block: Hardware/Software Design for Composable, Block-Atomic Processors", In Proceedings of 15th Workshop on Interaction between Compilers and Computer Architectures, Feb. 12, 2011, 8 Pages.
McDonald, et al., "Characterization of TCC on Chip-Multiprocessors", In 14th International Conference on Parallel Architectures and Compilation Techniques, Sep. 17, 2005, 12 Pages.
McDonald, et al., "TRIPS Processor Reference Manual", In Technical Report of Department of Computer Sciences, The University of Texas at Austin, Report No. TR-05-19, Mar. 10, 2005, 194 Pages.
Mei, Bingfeng, et al., "ADRES: An Architecture With Tightly Coupled VLIW Processor and Coarse-Grained Reconfigurable Matrix", In Proceedings of 13th International Conference on Field-Programmable Logic and Applications, Sep. 9, 2003, 10 Pages.
Melvin, et al., "Enhancing Instruction Scheduling with a Block-Structured ISA", In International Journal of Parallel Programming, vol. 23, No. 3, Jun. 1, 1995, pp. 221-243.
Munshi, et al., "A Parameterizable SIMD Stream Processor", In Proceedings of Canadian Conference on Electrical and Computer Engineering, May 1, 2005, pp. 806-811.
Muraoka, et al., "VCore-based design methodology", In Proceedings of the Asia and South Pacific Design Automation Conference, Jan. 21, 2003, pp. 441-445.
Nagarajan, et al., "A Design Space Evaluation of Grid Processor Architectures", In Proceedings of the 34th Annual ACM/IEEE International Symposium on Microarchitecture, Dec. 1, 2001, pp. 40-51.
"Cash: A C to Layout Compiler", Retrieved from <<http://www.cs.cmu.edu/afs/cs/academic/class/15745-s07/www/papers/cash-journal.pdf>>, Retrieved Date: Apr. 8, 2015, 29 Pages.
"Control Flow Graphs and Loop Optimization", Retrieved from <<https://engineering.purdue.edu/~milind/ece573/2011spring/lecture-11.pdf>>, Nov. 7, 2014, 38 Pages.
"Explicit Data Graph Execution", Retrieved From <<https://en.wikipedia.org/wiki/Explicit_Data_Graph_Execution>>, Retrieved Date: Jun. 13, 2017, 5 Pages.
"How Many Clock Cycles does a RISCICISC Instruction Take to Execute?", Retrieved from <<http://electronics.stackexchange.com/questions/170551/how-many-clock-cycles-does-a-risc-cisc-instruction-take-to-execute>>, Retrieved Date: Aug. 24, 2015, 5 Pages.
Zmily, et al., "Block-Aware Instruction Set Architecture", In Doctoral Dissertation, Degree of Doctor of Philosophy, Stanford University, Jun. 2007, 176 Pages.
"Intel® 64 Architecture Processor Topology Enumeration", In White Paper of Intel, Dec. 13, 2013, pp. 1-29.
"Load/store architecture", Retrieved From <<https://en.wikipedia.org/wiki/Load/store_architecture>>, Retrieved Date: Sep. 24, 2015, 1 Page.
"Loop-Invariant Code Motion with Unsafe Operations", Retrieved from <<https://web.archive.org/web/20150927030042/https://cs.stackexchange.com/questions/28054/loop-invariant-code-motion-with-unsafe-operations>>, Retrieved Date: Apr. 9, 2015, 4 Pages.
"Microarchitecture", Retrieved from <<https://github.com/jbush001/NyuziProcessor/wiki/Microarchitecture>>, Retrieved Date: Aug. 24, 2015, 7 Pages.
"Optimizations Enabled by a Decoupled Front-End Architecture", In Proceedings of IEEE Transactions on computers, vol. 50, Issue 4, Apr. 1, 2001, 32 Pages.
"Programmatic API for Building Resources", Retrieved From <<https://web.archive.org/web/20150706082232/https://jersey.java.net/nonav/documentation/2.0/resource-builder.html>>, Nov. 3, 2014, 3 Pages.
"Final Office Action Issued in U.S. Appl. No. 14/252,101", dated Jan. 12, 2017, 18 Pages.
"Non-Final Office Action Issued in U.S. Appl. No. 14/252,101", dated Jul. 7, 2016, 18 Pages.
"Non-Final Office Action Issued in U.S. Appl. No. 14/752,356", dated Mar. 21, 2017, 22 Pages.
"Non Final Office Action Issued in U.S. Appl. No. 14/752,418", dated May 18, 2017, 20 Pages.
"Non-Final Office Action Issued in U.S. Appl. No. 14/752,596", dated May 10, 2017, 22 Pages.
"Non Final Office Action Issued in U.S. Appl. No. 14/752,636", dated Apr. 14, 2017, 15 Pages.
"Non Final Office Action Issued in U.S. Appl. No. 14/752,660", dated Apr. 6, 2017, 22 Pages.
"Non-Final Office Action Issued in U.S. Appl. No. 14/752,682", dated May 5, 2017, 10 Pages.
"Notice of Allowance Issued in U.S. Appl. No. 14/752,685", dated Mar. 22, 2017, 12 Pages.
"Notice of Allowance Issued in U.S. Appl. No. 14/752,724", dated May 15, 2017, 15 Pages.
"Non-Final Office Action Issued in U.S. Appl. No. 14/752,727", dated Apr. 14, 2017, 11 Pages.
"Notice of Allowance Issued in U.S. Appl. No. 14/752,747", dated May 11, 2017, 14 Pages.
"Notice of Allowance Issued in U.S. Appl. No. 14/752,768", dated Apr. 28, 2017, 10 Pages.
"Non-Final Office Action Issued in U.S. Appl. No. 14/752,792", dated Apr. 11, 2017, 12 Pages.
"Office Action Issued in European Patent Application No. 14734631.6", dated Sep. 30, 2016, 5 Pages.
Aasaraai, et al., "Design Space Exploration of Instruction Schedulers for Out-of Order Soft Processors", In Proceedings of the International Conference on Field Programmable Technology, Dec. 8, 2010, 4 Pages.
Abraham, et al., "Predictability of Load/Store Instruction Latencies", In Proceedings of the 26th Annual International Symposium on Microarchitecture, Dec. 1, 1993, pp. 139-152.
Anderson, Michael, "A Framework for Composing High-Performance OpenCL from Python Descriptions", In Technical Report of Electrical Engineering and Computer Sciences, University of California at Berkeley, Report No. UCB/EECS—2014-210, Dec. 5, 2014, 144 Pages..
Appelbe, et al., "Hoisting Branch Conditions—Improving Super-Scalar Processor Performance, Languages and Compilers for Parallel Computing", In Proceedings of the 8th International Workshop on Languages and Compilers for Parallel Computing, Aug. 10, 1995, 14 Pages..
August, et al., "Architectural Support for Compiler—Synthesized Dynamic Branch Prediction Strategies: Rationale and Initial Results", (56) References Cited

OTHER PUBLICATIONS

In Proceedings of Third International Symposium on High-Performance Computer Architecture, Feb. 1, 1997, pp. 84-93.
Bakhoda, et al., "E2", Retrieved from <<http://research.microsoft.com/en-us/projects/e2//>>, Retrieved Date: Apr. 10, 2015, 2 Pages.
Benson, et al., "Design, Integration and Implementation of the DySER Hardware Accelerator", In IEEE 18th International Symposium on High Performance Computer Architecture, Feb. 25, 2012, 12 Pages.
Zmily, et al., "Block-Aware Instruction Set Architecture", In Doctoral Dissertation, Jun. 2007, 176 Pages.
Bouwens, et al., "Architecture Enhancements for the ADRES Coarse-Grained Reconfigurable Array", In Proceedings of the 3rd International Conference on High Performance Embedded Architectures and Compilers, Jan. 27, 2008, pp. 66-81.
Budiu, et al., "Optimizing Memory Accesses for Spatial Computation", In Proceedings of 1st International Symposium on Code Generation and Optimization, Mar. 23, 2003, 13 Pages.
Budiu, et al., "Pegasus: An Efficient Intermediate Representation", In Technical Report of School of Computer Science, Carnegie Mellon University, Report No. CMU-CS-02-107, Apr. 2002, 20 Pages.
Bush, et al., "Evaluation and Optimization of Signal Processing Kernels on the TRIPS Architecture", In Proceedings of 4th Annual Workshop on Optimizations for DSP and Embedded Systems, Mar. 2006, 10 Pages.
Cain, et al., "Memory Ordering: A Value-Based Approach", In Journal of IEEE Computer Society, vol. 24, Issue 1, Nov. 2004, pp. 110-117.
Carli, Roberto, "Flexible MIPS Soft Processor Architecture", In Technical Report of Massachusetts Institute of Technology, Jun. 16, 2008, pp. 1-49.
Chang, et al., "Cooperative Caching for Chip Multiprocessors", In Proceedings of the 33rd Annual International Symposium on Computer Architecture,, Jun. 17, 2006, 12 Pages.
Cheah, et al., "Analysis and Optimization of a Deeply Pipelined FPGA Soft Processor", In Proceedings of International Conference on Field-Programmable Technology, Dec. 10, 2014, 4 Pages.
Chiu, et al., "Hyperscalar: A Novel Dynamically Reconfigurable Multi-core Architecture", In Proceedings of 39th International Conference on Parallel Processing, Sep. 13, 2010, 10 Pages.
Choudhury, A.N.M Imroz., "Visualizing Program Memory Behavior Using Memory Reference Traces", In Ph.D. Thesis of University of Utah,, Aug. 2012, 158 Pages.
Chrysos, et al., "Memory Dependence Prediction using Store Sets", In Proceedings of the 25th Annual International Symposium on Computer Architecture, Jun. 1998, pp. 142-153.
Coons, et al., "A Spacial Path Scheduling Algorithm for EDGE Architectures", In Proceedings of the 12th International Conference on Architectural Support for Programming Languages and operating Systems, Oct. 20, 2006, 12 Pages.
Zmily, et al., "Improving Instruction Delivery with a Block-Aware ISA", In Proceedings of 11th International Euro-Par Conference on Parallel Processing, Aug. 30, 2005, pp. 530-539.
Coons, et al., "Feature Selection for Instruction Placement in an EDGE Architecture", Retrieved From <<https://pdfs.semanticscholar.org/4c38/8fbe53827627c21a9d2a650395ed4470e544.pdf>>, Mar. 17, 2007, 6 Pages.
Desikan, et al., "Scalable Selective Re-Execution for EDGE Architectures", In Proceedings of the 11th International conference on Architectural Support for Programming Languages and Operating Systems, Oct. 7, 2004, 13 Pages.
"International Preliminary Report on Patentability Issued in PCT Application No. PCT/US2016/038842", dated Sep. 27, 2017, 6 Pages.
"TRIPS (The Tera-op, Reliable, Intelligently adaptive Processing System)", Retrieved from: http://www.cs.utexas.edu/users/cart/trips/, 1 Page.
NC2017/0013251, "Office Action Issued in Colombian Patent Application No. NC2017/0013251", dated Jul. 4, 2018, 14 Pages. (W/O English Translation).
NC2017/0013252, "Office Action Issued in Colombian Patent Application No. NC2017/0013252", dated Jul. 5, 2018, 13 Pages.
NC2017/0013277, "Office Action Issued in Colombian Patent Application No. NC2017/0013277", dated Jul. 9, 2018, 13 Pages. (W/O English Translation).
"International Preliminary Report on Patentability Issued in PCT Application No. PCT/US2016/038852", dated Sep. 13, 2017, 9 Pages.

\* cited by examiner

EXPLICIT INSTRUCTION SCHEDULER STATE INFORMATION FOR A PROCESSOR

BACKGROUND

Designers of instruction set architectures (ISAs) and processors make power and performance trade-offs. As an example, if a designer chooses an ISA with instructions that deliver higher performance then the power consumption by the processor may be higher, as well. Alternatively, if the designer chooses an ISA with instructions that consume lower power, then the performance may be lower. The power consumption may be tied to the amount of hardware resources of the processor, such as arithmetic logic units (ALUs), cache lines, or registers, used by the instructions during execution. Use of a large amount of such hardware resources may deliver higher performance at the cost of higher power consumption. Alternatively, the use of a small amount of such hardware resources may result in lower power consumption at the cost of lower performance.

Compilers are used to compile high-level code into instructions compatible with the ISA and the processor architecture. The compiled instructions are issued by an instruction scheduler when they are ready to be issued.

SUMMARY

In one example, the present disclosure relates to explicitly generating scheduler state information using a compiler and using the scheduler state information within a processor. In one aspect, a method including, fetching a group of instructions, wherein the group of instructions is configured to execute atomically by a processor, is provided. The method may further include scheduling at least one of the group of instructions for execution by the processor before decoding the at least one of the group of instructions based at least on pre-computed ready state information associated with the at least one of the group of instructions.

In another aspect, a processor including an instruction scheduler configured to: (1) process pre-computed ready state information for at least one of a group of instructions, wherein the group of instructions is configured to execute atomically by the processor, and (2) schedule the at least one of the group of instructions for execution by the processor, before at least one of fetching or decoding the at least one of the group of instructions, based at least on the pre-computed ready state information associated with the at least one of the group of instructions, is provided.

In yet another aspect, a method including, using a compiler, processing instructions in a high-level language to generate at least one group of instructions, wherein the group of instructions is configured to execute atomically by a processor, where the processing further includes generating ready state information associated with a subset of the at least one group of instructions such that the subset of the instructions can be scheduled for execution by the processor without at least one of fetching or decoding the subset of the instructions, is provided. The method may further include storing the ready state information for subsequent processing by the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to instruction set architectures (ISAs) and processors that may have instructions organized in groups, e.g., instruction blocks, that are fetched, executed, and committed atomically. Thus, the processor may fetch the instructions belonging to a single group en masse, map them to the execution resources inside the processor, execute the instructions, and commit their results in an atomic fashion. The processor may either commit the results of all instructions or nullify the execution of the entire group. Instructions inside a group may execute in a data flow order. In addition, the processor may permit the instructions inside a group to communicate directly with each other. An instruction that produces a result may, instead of writing the result to a register file, communicate that result to another instruction that consumes the result. As an example, an instruction that adds the values stored in registers R1 and R2 may be expressed as shown in Table 1:

I[0] READ R1 T[2R];
I[1] READ R2 T[2L];
I[2] ADD T[3L].

In this way, source operands are not specified with the instruction; instead, they are specified by the instructions that target the ADD instruction. The compiler may explicitly encode the control and data dependencies during compilation of the instructions and thereby may free the processor from rediscovering these dependencies at runtime. This may advantageously result in reduced processor load and energy savings during execution of these instructions. As an example, the compiler may use predication to convert all control dependencies into data flow dependencies. Using these techniques, the number of accesses to power hungry register files may be reduced. Table 2, below, shows an example of a general instruction format for such instructions:

| OPCODE | PR | BID | XOP | TARGET1 | TARGET2 |

Each instruction may be of a suitable size, such as 32 bits, 64 bits, or another size. In the example shown in Table 2, each instruction may include an OPCODE field, a PR (predication) field, a BID (broadcast identifier) field, an XOP (extended OPCODE) field, a TARGET1 field, and a TARGET2 field. The OPCODE field may specify a unique operation code for an instruction or a group of instructions, such as add, read, write, or multiply. The PR (predication) field may specify any predication associated with the instruction. As an example, a two bit PR field may be used as follows: 00—not predicated, 01—reserved, 10—predicated on false, and 11—predicated on true. Thus, for example, if an instruction executes only if the result of a comparison is true, then that instruction may be predicated on the result of another instruction that performs the comparison. The BID (broadcast identifier) field may support sending of an operand to any number of consumer instructions in a group. A 2-bit BID field may be used to encode the broadcast channel the instruction receives one of its operands on. The XOP (extended OPCODE) field may support extending the types of opcodes. The TARGET1 and TARGET2 fields may allow up to two target instructions to be encoded. The target field may specify a consumer instruction of the result of the producer instruction, thus permitting direct communication between instructions.

Each group of instructions may have certain information associated with the group of instructions, such as control information and/or meta-information related to the group of instructions. This information may be generated by the compiler during compilation of higher-level code, such as C or C++ into instructions for execution on a processor consistent with the present disclosure. Some of this information may be extracted by the compiler when compiling a group of instructions and by examining the nature of the instructions during runtime. Additionally or alternatively, the information associated with the group of instructions may be meta-information concerning the group of instructions. In one example, such information may be provided to a processor using special instructions or instructions that provide target encoding related to registers or other memory that may have the relevant information associated with the group of instructions. In case of special instructions, the opcode field of such instructions may be used to communicate information relating to the group of instructions. In another example, such information may be maintained as part of the processor status word (PSW). In one example, this information may advantageously help the processor execute the group of instructions more efficiently. One example of the types of information that could be provided to the processor using a group header, using special instructions, using memory referenced locations, using the processor status word (PSW), or using a combination of these, is in Table 3 below:

| Type of Information (Fields) | Description |
| --- | --- |
| ID | This field may be set to 1 to indicate the beginning of a valid group of instructions. It may also include information regarding machine version and architecture version. In addition, this field may be used to indicate to the processor whether the group header has any ready bits or valid bits, such as, as part of the READY STATE field. |
| SIZE | This field may contain the number of 4 instruction chunks contained in a group of instructions. Thus, for example, a value of 00 may indicate the smallest group of instructions in the group, e.g., a group header followed by 4 instructions. A value of 01 may indicate a group header followed by 8 instructions. A value of 10 may indicate a group header followed by 16 instructions. A value of 11 may indicate a group header followed by 32 instructions. This field may encode the size of the group of instructions in other ways. As an example, this field may specify the precise number of instructions in the group, e.g., a group header followed by seven instructions. As another example, this field may result in the processing of a function by the processor resulting in information about the size. |
| XFLAGS | This field may include flags that indicate special execution requirements for the group of instructions, such as:<br>XFLAGS[0] Vector Mode<br>This flag may indicate that the instructions will be copied into independent vector lanes, each of which may include an instruction window, operand buffers, an ALU, and registers.<br>XFLAGS[1] Inhibit Branch Predictor<br>This flag when set may result in the branch predictor being inhibited. This may prevent the branch predictor from predicting which way a branch will go before this is known for sure.<br>XFLAGS[2] Inhibit Memory Dependence Predictor<br>This flag when set may result in memory dependence being inhibited. This may prevent the memory dependence predictor from predicting dependencies between memory operations, such as load/store operations.<br>XFLAGS[3] Block Synchronization Required<br>This flag when set may impose a requirement that another group of instructions may not be executed on another core in parallel with the current group of instructions. In addition, this flag when set may also impose a requirement that the group of instructions may not execute speculatively.<br>XFLAGS[4] Break After Block<br>This flag when set may indicate that there is a break after thegroup of instructions.<br>XFLAGS[5] Break Before Block<br>This flag when set may indicate that there is break before the group of instructions.<br>XFLAGS[6] Reserved<br>This flag may be reserved for future use.<br>XFLAGS[7] Reserved<br>This flag may be reserved for future use. |
| EXIT TYPES | This field may encode up to six 3-bit group exit types for use by the branch predictor.<br>000 - Null<br>This branch exit type may indicate to the branch predictor that there is no information for the branch predictor in this field.<br>001 - Sequential<br>This branch exit type may indicate to the branch predictor that the next branch is to the next group of instructions in the code.<br>The sequential branch exit type may be computed by factoring in the current address of the group of instructions and the size of the group of instructions, e.g., a current block address and the size of the block.<br>010 - Offset<br>This branch exit type may indicate to the branch predictor that the next branch is to a block relative offset address, where the offset is treated as a group offset.<br>011 - Indirect<br>This branch exit type may indicate to the branch predictor that the next branch is an indirect type. Thus, for example, it may rely on a register of a memory location that contains the address of the beginning of the successor group of instructions and their associated group header.<br>100 - Call<br>This branch exit type may indicate to the branch predictor that if the successor group of instructions contains a subroutine call then the predicted branch goes to that successor group of instructions.<br>101 - Return<br>This branch exit type may indicate to the branch predictor that if the successor group of instructions contains a return from a subroutine call then the predicted branch goes to that successor group of instructions.<br>Other bit patterns may be reserved for future uses. |

-continued

| Type of Information (Fields) | Description |
|---|---|
| STORE MASK | This field may identify the load-store identifiers (LSIDs) that are assigned to stores. As an example, the LSQ block may have to receive each of the LSIDs assigned to stores for a group of instructions before the group of instructions is allowed to complete. |
| WRITE MASK | This field may identify the global registers that the group of instructions may write. As an example, the register file may have to receive each entry of writes before the group of instructions is allowed to complete. |
| READY STATE | This field may identify instructions within a group of instructions that are ready to be issued by a processor. In one example, there may be pre-computed ready state information for certain instructions in this field. Those instructions may be identified in various ways, including, for example: (1) the first five (or any other number) instructions in the group of instructions may be indicated as ready to be issued; in one example, the first five instructions may be the five instructions immediately preceded by the group header for the group of instructions (2) every odd instruction may be indicated as ready to be issued, or (3) bits in the READY STATE field may identify particular instructions that are ready to be issued. Alternatively, each instruction in the group of instructions may have a ready bit, which may indicate to an instruction scheduler whether the instruction is ready to be scheduled or issued. Each instruction may also have valid bits relating to whether a true predicate is ready, a false predicate is ready, a left operand is ready, or a right operand is ready. In one example, the ready bit may be set to true when all of the valid bits for an instruction are set to true or are otherwise indicated as being not relevant. In addition, this field may have two bits related to broadcast channels. The two bits may specify whether there are any broadcasts on any of the three channels and may also specify that there are no broadcasts in the group of instructions. For each instruction in the group of instructions, six bits per instruction in this field may be used to communicate pre-computed ready state information to the processor. |

While the exemplary group header shown in Table 3 includes many fields, it is merely exemplary. In one embodiment, the compiler may select information for inclusion in a group header or for special instructions that can provide such information to the processor based on the nature of instructions and/or based on the nature of the processing requirements, such as high-performance or low-power. This may advantageously allow better balancing of trade-offs between performance and power consumption. For certain types of processing applications, such as high performance computing with a large number of cores, a large amount of information may be a desirable option. Alternatively, for other types of processing applications, such as embedded processors used in the Internet of Things, mobile devices, wearable devices, or other embedded computing type of applications, less information may be a desirable option. In another aspect, the extent of the information communicated via a group header or special instructions could be tailored depending upon the nature of the instructions in the group of instructions. For example, if the group of instructions includes a loop that is executed several times, then more extensive information might be needed to encapsulate the control information corresponding to the group of instructions. The additional control information may allow the processor to execute the loop more efficiently and thus improve performance. Alternatively, if there is a group of instructions that will be rarely executed, then relatively less information may suffice. In another example, if the group of instructions includes a predicated control loop, then more information may be needed. Similarly, if the group of instructions has an extensive amount of instruction level parallelism, then more information may be needed as part of a group header of via special instructions. The additional control information in the group header or special instructions could be used to effectively exploit the instruction level parallelism in the group of instructions. In another example, if the group of instructions includes several branch instructions, then more information may be needed. The additional control information regarding branch instructions will make the code execution more efficient as it will result in fewer pipeline flushes.

The READY STATE field may be used to store pre-computed ready state information, e.g., pre-computed ready bits or valid bits (e.g., for operands targeted by an instruction) corresponding to instructions in the group of instructions. This way a compiler may be used to explicitly provide state information of instructions to an instruction scheduler. This may advantageously facilitate dataflow instruction scheduling and out of order execution of the instructions. As an example, an instruction may be ready to be issued by an instruction scheduler when all of the ready bits corresponding to that instruction are set to logic high (or logic low). Thus, an instruction may be ready to be scheduled or issued even before it is fetched or decoded, if it has no operands or other inputs pending. An instruction, such as an ADD instruction may be ready to be scheduled or issued when both operands for the ADD instruction have been computed. As an example, there could be one valid bit for the left operand of the ADD instruction and another valid bit for the right operand of the ADD instruction. In another example, a predicated instruction may be ready when the predicate has been evaluated. Thus, for example, if the predicated instruction is predicated on a true value, then once the true value is evaluated, that instruction may be ready to be issued. In a simplified example, an instruction before being issued may be waiting on three inputs—true or false predicate, left operand, and right operand. Other instructions may not have any inputs that they need to wait on, such as ADDI (add immediate) or READ values of operands from certain registers. In addition, certain results may need to be communicated to several instructions and in that case the instructions that need the result could monitor a broadcast channel. For example, certain predicated instructions, such as a branch instruction may execute only if its predicate is true or false. Both predicated branch instructions (e.g. BRO.T and BRO.F) may monitor broadcasts on a certain channel. The branch that will receive a matching predicate may issue. As another example, load instructions may monitor a channel, as well, and when the operands are available on that channel, they may issue. Broadcast instructions waiting on a broadcast ID (BID) may be ready when they receive ready bits from instructions targeting them or from the group header.

Load and store instructions may be issued by the instruction scheduler of a processor in dataflow order. When the load address or the store address/data are determined, the load and/or the store instructions may be queued in a load/store queue until prior memory operations have been observed and/or the group of instructions commits. The load/store operations may have corresponding load/store ids (LSIDs) to ensure that they are executed in the right order. As an example, consider a load instruction with LSID#2 and a store instruction with LSID#1. Assuming the load instruction arrives first at the load/store queue, then the load/store queue will queue the load instruction awaiting the arrival of the store instruction that has a lower identifier number—LSID#1. Once the value for the store instruction is computed, it goes to the load/store queue. Now that load/store queue has observed the stores that might have occurred before the load, the load instruction may execute. Load/store queue may also ready the load instruction's target instruction(s) operand and write the load result back to the operand buffers of the processor and/or the register file of the processor.

In one example, the pre-computed ready state information may not only be included in the group header, such as in the READY STATE field in Table 3, but may also be included as part of the instructions in the group of instructions. In another example, the pre-computed ready state information may only be included in the group header, such as in the READY STATE filed in Table 3 and not included as part of the instructions in the group of instructions. Thus, as an example, the group header may only include the predicate state readiness information and the operand state readiness information; but the instructions may not themselves have this information.

In another example, the group header for the various groups of instructions may or may not include the pre-computed ready state information. A field in the group header may indicate whether that particular group header has any pre-computed ready state information or not.

The functionality corresponding to the fields, shown in Table 3, may be combined or further separated. Thus, for example, in one example, the READY STATE field may be in a separate header. It could also be in a memory indexed by an address or a descriptor field in the group header or another structure. Similarly, a special instruction may provide information related to any one of the fields in Table 3 or it may combine the information from such fields. As an example, while the exemplary group header of Table 3 includes a separate ID field and a SIZE field, these two fields could be combined into a single field. Similarly, a single special instruction could, when decoded, may provide information regarding the size of the group of instructions and the information in the ID field. Other changes could be made to the group header structure and format without departing from the scope of this disclosure. As an example, additional fields that include information relating to the characteristics of the group of instructions could be included. Certain fields might be included based on the frequency of the execution of the group of instructions.

The fields included in the group header structure, or information provided via special instructions or other mechanisms discussed earlier, may be part of a publicly available standard Instruction Set Architecture (ISA) of a particular processor or a family of processors. A subset of the fields may be a proprietary extension to the ISA. Certain bit values in the field may be part of the standard ISA for the processor, but certain other bit values in the field may provide proprietary functionality. This exemplary field could allow an ISA designer to add proprietary extensions to the ISA without disclosing entirely the nature and the functionality associated with the proprietary extension. Thus, in this instance, the compiler tools distributed by the ISA designer would support the proprietary bit values in the field, an entirely separate proprietary field, or a special instruction. Such a field may be used for hardware accelerators that are proprietary to certain processor designs. Thus, a program may include a group header field or a special instruction that is unrecognizable; but the program may further include a recipe to decipher the field or decode the instruction.

A suitable compiler may process a group of instructions, configured to execute atomically by a processor, to generate information about the group of instructions, including meta-information and control information about the group of instructions. As part of this process, the compiler may also compute ready state information for use consistent with this disclosure. Some programs may be compiled for only one set of ISA, e.g., an ISA used with processors for Internet of Things, mobile devices, wearable devices, or other embedded computing environments. Compiler may use techniques, such as static code analysis or code profiling to generate the information relevant to the group of instructions. Complier may consider factors, such as the characteristics of the group of instructions and the frequency of the execution of the group of instructions. The relevant characteristics of the group of instructions, include, but are not limited to: (1) the instruction level parallelism, (2) the number of loops, (3) the number of predicated control instructions, and (4) the number of branch predictions.

One example of a simplified 320 bit group header is shown in Table 4 below:

| 127 | 64 63 | 32 31 | 14 13 | 6 5 | 1 0 |
|---|---|---|---|---|---|
| WRITE MASK | STORE MASK | EXIT TYPES | XFLAGS | SIZE | ID |

| 320 | | | | | | | | | | | | | | | | | | | | | | | | | | | | | | | 128 |
|---|---|---|---|---|---|---|---|---|---|---|---|---|---|---|---|---|---|---|---|---|---|---|---|---|---|---|---|---|---|---|---|
| | | | | | | | | | | | | | | | | | | | | | | | | | | | | | | | |

The first part of the group header (128 bits) includes fields, such as ID, SIZE, XFLAGS, EXIT TYPES, STORE MASK, and WRITE MASK, as discussed with respect to Table 3. In this example, the second part of the group header (192 bits) corresponds to the pre-computed READY STATE bit values for each of the 32 instructions in the group of instructions. This way, as discussed earlier with respect to Table 3, information related to the state of operands and predicates may be included in the group header. Table 4 above is merely exemplary. The information related to an instruction's ready state may be encapsulated in other ways. In addition, a smaller field for the pre-computed READY STATE may be used. As part of this field, the only information that may be communicated is how many of the instructions after the group header are ready to be scheduled for execution. In another example, as part of this field, the only pre-computed ready state information may indicate whether only the odd instructions or only the even instructions are ready to be scheduled for execution.

In another example, the READY STATE bits (e.g., six groups of 32 bits, e.g., 192 bits of Table 4) for a group of 32 instructions may be stored as shown in Table 5 below:

| INSTRUCTIONS | | | | | |
|---|---|---|---|---|---|
| READY STATE | | | | | |
| | 31 | ... | 3 | 2 | 1 | 0 |
| PREDICATE TRUE | 0 | | 0 | 0 | 1 | 1 |
| PREDICATE FALSE | 1 | | 1 | 1 | 1 | 1 |
| OPERAND0 | 0 | | 1 | 0 | 0 | 0 |
| OPERAND1 | 0 | | 1 | 0 | 0 | 0 |
| BID | 1 | | 0 | 0 | 0 | 0 |
| BID | 0 | | 0 | 0 | 0 | 0 |

Figure 1:
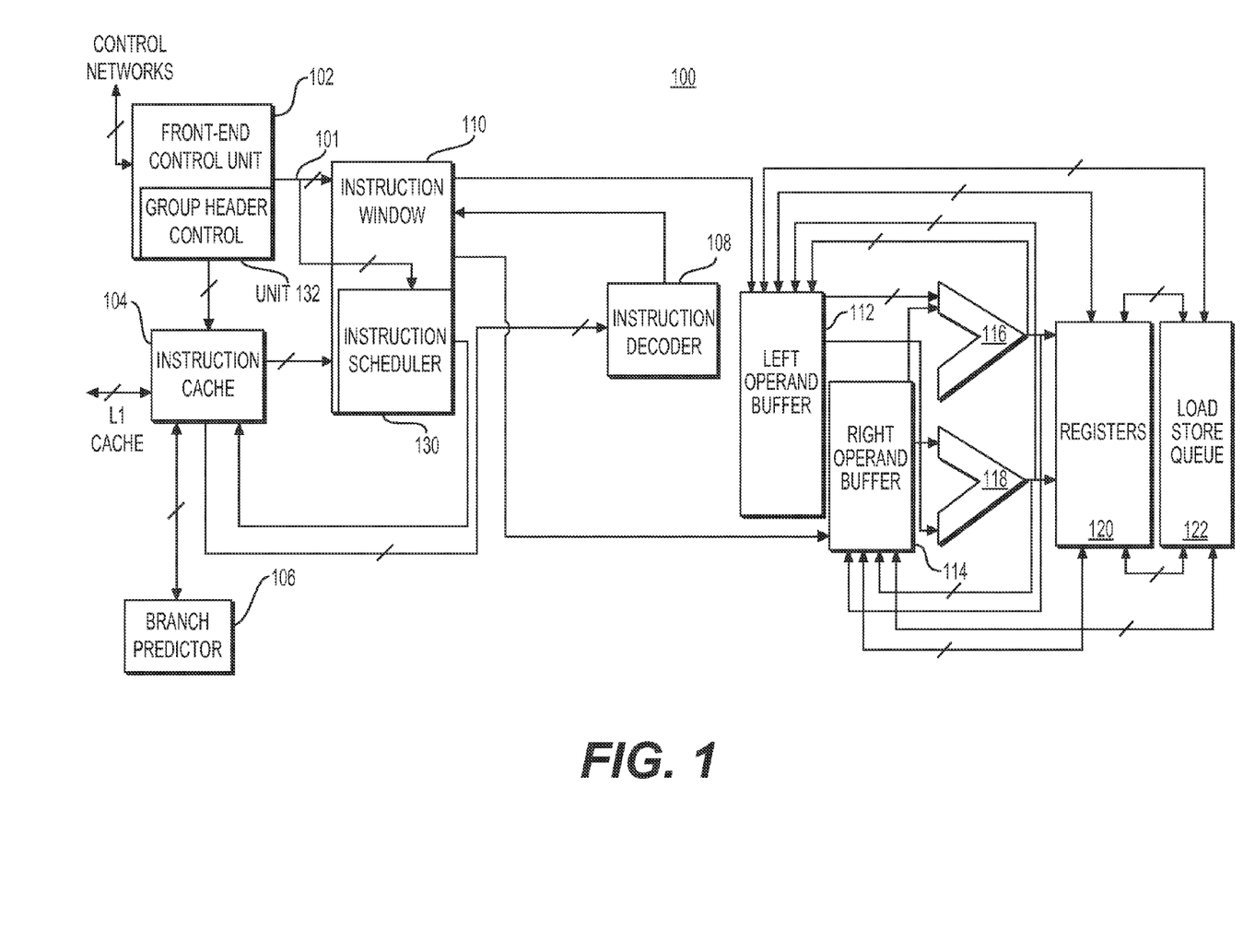
FIG. 1 is a block diagram of a representative processor in accordance with one example.

FIG. 1 is a block diagram of a portion of a representative processor 100 in accordance with one example of the present disclosure. Processor 100 may include a front-end control unit 102, an instruction cache 104, a branch predictor 106, an instruction decoder 108, an instruction window 110, a left operand buffer 112, a right operand buffer 114, an arithmetic logic unit (ALU) 116, an arithmetic logic unit (ALU) 118, registers 120, and a load/store queue 122. In one example, each of the components of processor 100 may be interconnected via data and/or control busses, as shown by lines with arrows connecting the various components. In some instances, the busses may carry only data and instructions; in some instances, the busses may carry only data (e.g., operands); in other instances the busses may carry only control signals, e.g., front-end control unit 102 may communicate, via a bus that carries only control signals, with other control networks. In one example, front-end control unit 102 may include combinational logic and state machines to handle the front end of the processing, including instruction fetch and decode. As an example, front-end control unit 102 may fetch instructions from instruction cache 104 for processing by instruction decoder 108. Front-end control unit 102 may exchange control information with other portions of processor 100 via control networks. Processor 100 may include a single core or multiple cores. In case of a multi-core processor, there may be multiple instances of at least some of the elements shown in FIG. 1. Front-end control unit 102 may co-ordinate and manage control of various cores and other parts of the processor. Thus, in this example, groups of instructions may be simultaneously executing on multiple cores and front-end control unit 102 may exchange control information via control networks with other cores to ensure synchronization, as needed, for execution of the various groups of instructions. Front-end control unit 102 may fetch and decode a single instruction or multiple instructions per clock cycle. Although FIG. 1 shows a certain number of components of processor 100 arranged in a certain manner, there could be more or fewer number of components arranged differently. As an example, instead of instruction cache 104, a simpler instruction memory or a scratch pad memory may be used to store instructions.

In one example, ready state of instructions in a group of instructions may be determined during compilation by a compiler and any bits (e.g., ready and valid bits) relating to the ready state of the instructions may be stored in READY STATE field of a group header, such as the ones shown in Table 3 and Table 4 or in another place, such as a table shown in Table 5. The pre-computed ready state information may also be communicated by the compiler to processor 100 using other mechanisms, such as using special instructions, using memory referenced locations, using the processor status word (PSW), or using a combination of these. In this manner, once front-end control unit 102 fetches a group of instructions, including the group header for the group of instructions, processor 100 may start scheduling, even before decoding, certain instructions for execution that are indicated as being ready in the pre-computed READY STATE field of the group header. As discussed earlier, processor 100 may schedule ready to issue instructions even without fetching such instructions. As a result, the scheduling of the ready to issue instructions may advantageously occur in just one or two cycles (e.g., immediately after processing of the pre-computed ready state information via processing the group header or otherwise) rather than having to fetch the instructions sequentially and discovering later (e.g., 3 to 30 cycles later) that some of the instructions are ready to issue. In addition, with the pre-computed ready state information being available at the start of the fetch cycle, any instruction that targets another instruction operand may do so right away. This may advantageously relieve processor 100 from the responsibility of managing the wakeup state data writes for target instructions that have not been decoded yet (e.g., instruction #10 targets instruction #40's operands, but instruction #40 has not been decoded yet). Pre-computed ready state information helps schedule, without decoding, not only instructions that are immediately issuable (0 inputs, no predication), but also instructions that are not yet issuable but become issuable. As an example, instruction #1 (MOVI) is an immediately issuable instruction. Instruction #1 targets instruction #20, an ADDI instruction, whose pre-computed ready state indicates that it is ready to issue except that its (first and only) left operand, operand 0, is not ready. Based upon pre-computed ready state, the MOVI instruction issues right away; it is then decoded and executed. During decode of instruction #1 (MOVI) processor 100 discovers that the MOVI instruction targets the left operand of instruction #20 (ADDI). The ready state of instruction #20 (ADDI), e.g., not ready (awaiting operand 0) is updated after issuing and decoding instruction #1 (MOVI), and as a result, instruction #20 (ADDI) becomes ready to issue. In the next cycle, instruction #20 (ADDI) issues and is then decoded. In addition, in another example, the pre-computed ready state may even include additional information relating to the target field(s) of an instruction. Thus, for example, the pre-computed ready state may include a value corresponding to the left operand of instruction #20 (ADDI). In this case, instruction #1 (MOVI) may be issued without fetching it and then instruction #20 (ADDI) may be issued without fetching it. In other words, the ready state of instruction #20 (ADDI), e.g., not ready (awaiting operand 0) is updated after fetching instruction #1 (MOVI), and as a result, instruction #20 (ADDI) becomes ready to issue. These examples illustrate that with pre-computed ready state, processor 100 may advantageously implement dataflow instruction scheduling for both initially ready instructions and "initially not ready" instructions, without fetching and/or decoding these instructions until they issue.

The ready to schedule instructions may be provided directly to instruction window 110 and instruction scheduler 130. In another example, front-end control unit 102 may fetch the ready to issue instructions directly from a cache (e.g., L-1 cache) during issue. In this example, the ready to issue instructions may not be stored in instruction window 110 at all; instead they may be fetched from the L-1 cache during issue. Instruction scheduler 130 may schedule the instructions for execution without these instructions being fetched or decoded by instruction decoder 108. This may advantageously result in saving of hardware area for a processor by removing the need for a large decoded instruction buffer or cache. In this way, processor 100 may schedule and issue, then fetch the instruction from instruction cache 104, decode it and without having to buffer the decoded instruction, execute it. The precomputed ready state information may, however, need storing in a cache, such as a ready state cache. In addition, having ready state information pre-computed and stored in, e.g., the READY STATE field, processor 100 may advantageously issue instructions out of order; as long as the instruction is ready to be scheduled, even before fetching or decoding, it could be scheduled for execution by instruction scheduler 130. In one example, each cycle, instruction scheduler 130 may select the next instruction to schedule. As noted earlier, with the compiler generating information about the group of instructions, such as the READY STATE field information, processor 100 may be more efficient in consuming hardware resources during execution of the group of instructions. Instruction scheduler 130 may process the READY STATE field of a group header or another source of ready state information and determine which of the instructions in a group of instructions is ready to issue before even fetching and/or decoding the instructions. This process may include instruction scheduler 130 processing ready state information, such as bit vectors associated with each instruction and/or the group header associated with the group of instructions. With continued reference to FIG. 1, instruction scheduler 130 may provide an instruction number (IID) for an instruction that is ready to issue and that number may be combined with the address of the group of instructions to which the instruction relates to generate the instruction address in instruction cache. After obtaining the ready to issue instruction from instruction cache 104, instruction scheduler 108 may provide it to instruction decoder 108.

Once an instruction is issued, any operands may be obtained from left operand buffer 112 and/or right operand buffer 114 (as needed). Depending on the opcode of the instruction, operations may be performed on the operands using ALU 116 and/or ALU 118. The outputs of an ALU may be written back in an operand buffer or in one or more registers 120. Store operations that issue in a data flow order may be queued in load/store queue 122 until the group of instructions commits. When the group of instruction commits, load/store queue 122 may write the committed group's stores to a memory system. Branch predictor 106 may process information relating to branch exit types from a group header, a special instruction, or a memory referenced location and factor that information in making branch predictions.

With continued reference to FIG. 1, front-end control unit 102 may further include a group header control unit 132. Group header control unit 132 may process control information and/or meta-information for a group of instructions that may be executed atomically. As an example, group header control unit 132 may process the SIZE field of the group header and as a result processor 100 may know exactly how many cache lines the group of instructions spans and thus processor 100 can immediately start fetching the instructions. In one example, group header control unit 132 may create and process group headers for such a group of instructions. As discussed earlier with respect to Table 3 the group header may include control information and/or meta-information regarding the group of instructions. Group header control unit 132 may include combinational logic, state machines, and temporary storage units, such as flip-flops to process the various fields in the group header. In one example, the control information and/or the meta-information for a group of instructions may include pre-computed ready-state information. This information may help processor 100 schedule instructions for execution even before they are decoded, as explained earlier.

In one example relating to a group of instructions with a fixed size (e.g., 32 instructions) the group header will be at the beginning of a group of instructions and thus the initial value of the program counter (PC) will point to the group header. In another example relating to a variable size of group of instructions (e.g., 32, 64, 96, or 128 instructions), front-end control unit 102 will provide information regarding the size of the group of instructions currently in the instruction window to group header control unit 132. Once group header control unit 132 has this information, it may use it and the PC value to determine the location of the group header. As an example, consider the following group of instructions:

READ
READ
ADD
TLEI
BRO.T B1
BRO.F B1

In the above example, each of the instructions may have associated with it six bits of pre-computed ready state information, including, as needed, valid bits for the various inputs to each instruction. Not all of the instructions may have pre-computed ready state information. The pre-computed ready state information will allow an instruction scheduler to schedule instructions that are ready to issue. Table 5 below represents the ready state for the above instructions:

| Instruction | Pre-computed READY STATE | | | | |
|---|---|---|---|---|---|
| | BID | OP1 | OP2 | predicate true | predicate false |
| READ | 00 | 1 | 1 | 1 | 1 |
| READ | 00 | 1 | 1 | 1 | 1 |
| ADD | 00 | 0 | 0 | 1 | 1 |
| TLEI | 00 | 0 | 1 | 1 | 1 |
| BRO.T B1 | 01 | 0 | 1 | 0 | 1 |
| BRO.T B1 | 01 | 0 | 1 | 1 | 0 |

The first four non-predicated instructions have predicate true and predicate false bits set reflecting that they do not await any predicate results. The two READ instructions, un-predicated and awaiting no input operands, are immediately ready to issue. As an example, the two READ instructions may be immediately scheduled by instruction scheduler 130 for issuance. Thus, the first READ instruction may be issued in the first cycle (assuming only one instruction being issued per cycle) and the second READ instruction may be issued in the second issue cycle. These instructions will not need to be fetched and/or decoded before being scheduled for execution, as the pre-computed ready state provides the instruction scheduler with the information to schedule these instructions for execution. This may again advantageously improve the performance of a processor that implements pre-computed ready state functionality. This is because without the pre-computed ready state information, the processor will have to first fetch and decode these instructions to create this information before issuing any instructions. While these two READ instructions are issued, instruction scheduler 130 may schedule the ADD instruction for decoding. Next, instruction scheduler 104 may evaluate the state of inputs, i.e., the state of the two operands read by the READ instructions. As the READ instructions target ADD operands, instruction scheduler 130 may update the ready state information for the ADD instruction and issue the ADD instruction. ADD instruction's TARGET1 field (see e.g., Table 2) may target the TLEI instruction. Instruction scheduler 130 may update the ready state information for the TLEI instruction and issue the TLEI instruction. In this example, the TLEI (test-less-than-or-equal-immediate) instruction broadcasts its predicated outcome on channel 1; the two branch instructions, one predicated on true value and the other on false value, await the predicated result from the TLEI instruction. The branch instructions may be scheduled to issuance awaiting the result of the TLEI instruction. One of them may be issued next depending upon whether the predicate evaluated true or false. As illustrated in this example, with the help of pre-computed ready state information, processor 100 may advantageously execute instructions faster than otherwise.

Figure 2:
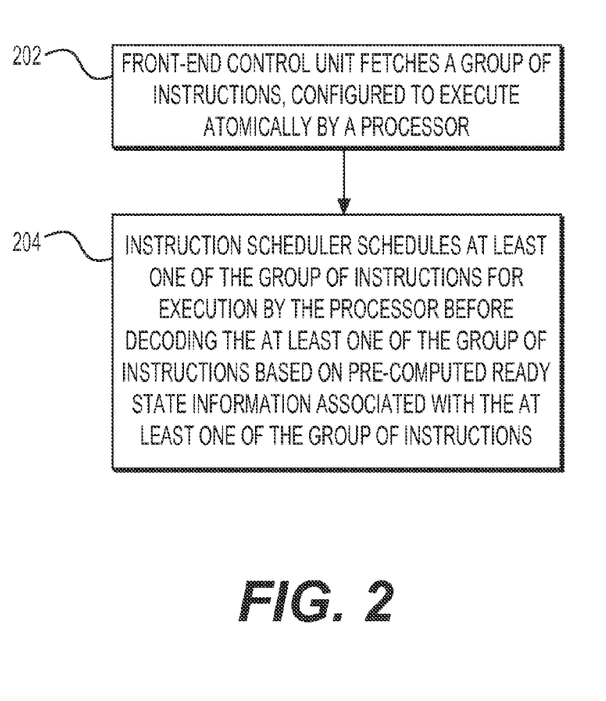
FIG. 2 is a flow diagram of a method in accordance with one example.

FIG. 2 is a flow diagram of a method in accordance with one example. In step 202, as an example, front-end control unit 102 may fetch a group of instructions that are configured to execute atomically by a processor, e.g., processor 100. After the group of instructions has been fetched by front-end control unit 102, the processing may move to step 204.

In step 204, as an example, instruction scheduler 130 may schedule at least one of the group of instructions for execution by processor 100 before decoding the at least one of the group of instructions based on pre-computed ready state information associated with the at least one of the group of instructions. As discussed earlier, with various examples, scheduling of instructions, whose READY STATE has been pre-computed by a compiler, as an example, may advantageously allow the processor to process instructions in a dataflow order, out of program order, and faster. In one example, the pre-computed ready state information may include a ready bit associated with the at least one of the group of instructions. The pre-computed ready state information may also include a number of instructions immediately preceded by a group header for the group of instructions that can be executed by the processor before decoding. The pre-computed ready state information may include a number of valid bits, e.g., as discussed earlier, where each of the valid bits may indicate a readiness of an input to the at least one of the group of instructions. The valid bits may include: (1) at least one bit indicating a readiness of a left operand input to the at least one of the group of instructions and (2) at least a second bit indicating a readiness of a right operand input to the at least one of the group of instructions. The valid bits may also include information about at least one broadcast channel that the at least one of the group of instructions may monitor in order to receive an input via the broadcast channel. The pre-computed ready state information may also include at least one bit indicating whether a predicate associated with the at least one of the group of instructions needs evaluation. The pre-computed ready state information may also include information identifying specific instructions that can be executed by the processor before decoding. The pre-computed ready state information may also include a bit vector such that a logic state associated with each bit in the bit vector includes information identifying instructions that can be executed by the processor before decoding.

Figure 3:
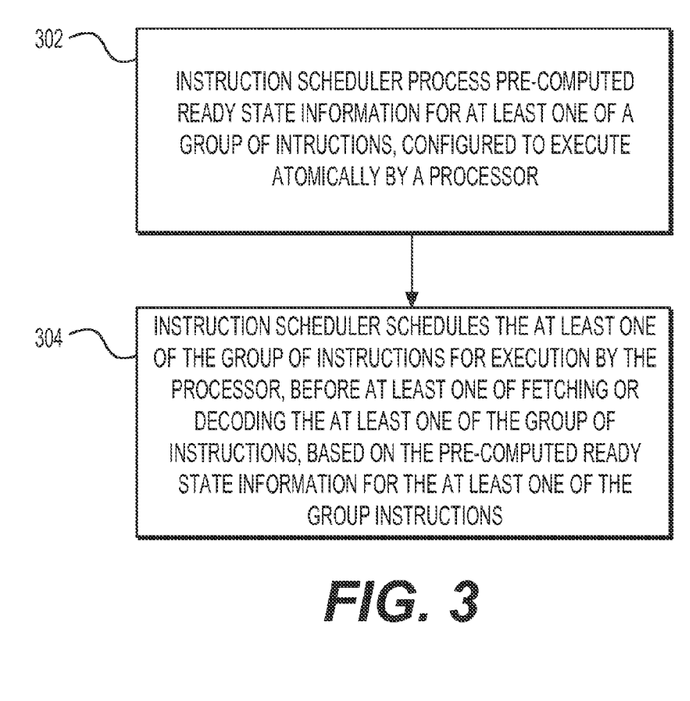
FIG. 3 is a flow diagram of a method in accordance with one example.

FIG. 3 is a flow diagram of a method in accordance with one example. In step 302, as an example, instruction scheduler 130 may process pre-computed read state information for at least one of a group of instructions that are configured to execute atomically by a processor, e.g., processor 100. As part of this step, instruction scheduler 130 may process a group header for the group of instructions, where the group header includes pre-computed ready state information for at least one of the group of instructions. An example of such a group header, including a READY STATE field, is discussed earlier with respect to Table 3. After the instruction scheduler 130 has processed the pre-computed ready state information, the processing may move to step 304.

In step 304, as an example, instruction scheduler 130 may schedule at least one of the group of instructions for execution by the process before fetching and/or decoding the at least one of the group of instructions based on pre-computed ready state information associated with the at least one of the group of instructions. As discussed earlier, with various examples, scheduling of instructions, whose READY STATE has been pre-computed by a compiler, as an example, may advantageously allow the processor to process instructions in a dataflow order, out of program order, and faster. In one example, the pre-computed ready state information may include a ready bit associated with the at least one of the group of instructions. The pre-computed ready state information may also include a value indicative of instructions that can be scheduled for execution by the instruction scheduler for the processor before fetching and/or decoding such instructions. The pre-computed ready state information may include a number of valid bits, e.g., as discussed earlier, where each of the valid bits may indicate a readiness of an input to the at least one of the group of instructions. The valid bits may include: (1) at least one bit indicating a readiness of a left operand input to the at least one of the group of instructions and (2) at least a second bit indicating a readiness of a right operand input to the at least one of the group of instructions. The valid bits may also include information about at least one broadcast channel that the at least one of the group of instructions may monitor in order to receive an input via the broadcast channel. The pre-computed ready state information may also include at least one bit indicating whether a predicate associated with the at least one of the group of instructions needs evaluation. The pre-computed ready state information may also include information identifying specific instructions that can be scheduled for execution by the processor before decoding. The pre-computed ready state information may also include a bit vector such that a logic state associated with each bit in the bit vector includes information identifying instructions that can be scheduled for instruction by the processor before decoding.

Figure 4:
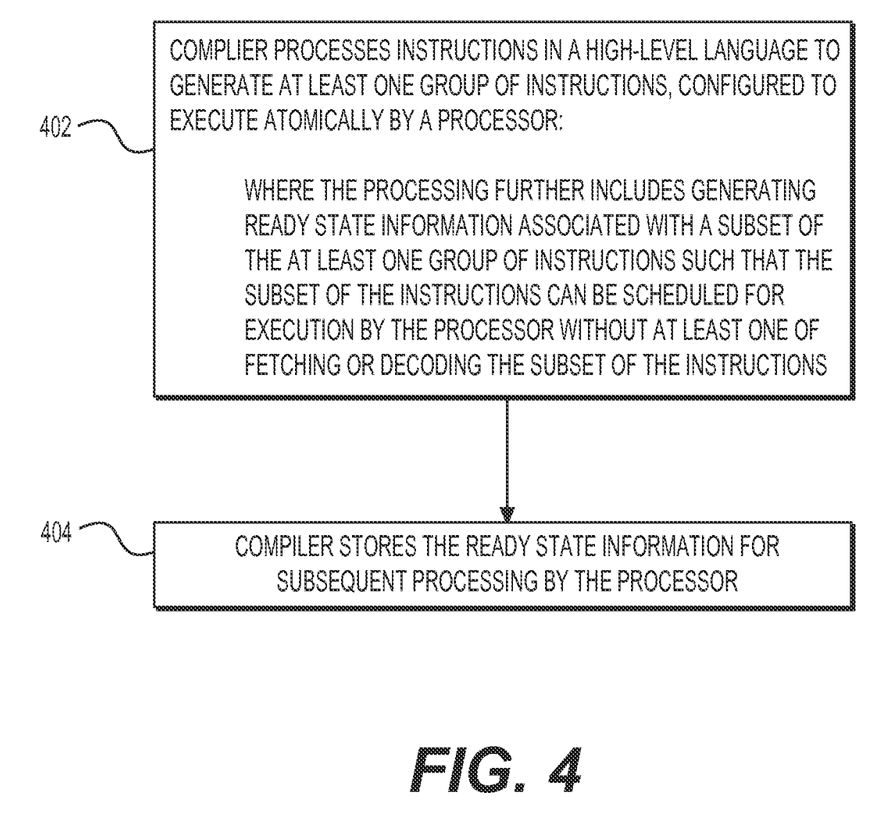
FIG. 4 is a flow diagram of a method in accordance with one example.

FIG. 4 is a flow diagram of a method in accordance with one example. As an example, this method relates to, in step 402, a compiler processing instructions in a high-level language to generate at least one group of instructions that are configured to execute atomically by a processor. In addition, in step 402, the processing may further include generating ready state information associated with a subset of the at least one group of instructions such that the subset of the instructions can be scheduled for execution by the processor without fetching and/or decoding the subset of the instructions.

One example of an exemplary program in a high-level language and its compilation into groups of instructions, including group headers with pre-computed ready state information, is shown below:

Program:

```
int main( ) {
    int a = 1;
    int b = 1;
    int c;
    while ((c = a + b) <100) {
        a = b;
        b = c;
    }
    return c:
}
```

An exemplary compiled program with groups of instructions and group headers is shown below:

```
blk0
        truncated header   [010]
        movi               t3, 1          ; [0] W[3]
        movi               t4, 2          ; [1] W[4]
        _write             g3, t3
        _write             g4, t4
        bro                blk1           ; [2]
blk1
        truncated header   [010]
        read               t3, g3         ; [0] N[2,0]
        read               t4, g4         ; [1] N[4,1] N[3.0]
        mov                t5, t3         ; [2] N[4,0]
        mov                t3, t4         ; [3] W[3]
        _write             g3, t3
        add                t4, t5, t4     ; [4] N[5,0] W[4]
        _write             g4, t4
        tlei               p0, t4, 99     ; [5] B[1,P]
        bro_t<p0>          blk1           ; [6] B1
        bro_f<p0>          blk2           ; [7] B1
blk2
```

In the example above, the groups of instructions include instructions, such as read, mov, and add. The read instruction is used to read values of operands from registers. The mov instruction is used to move or copy operands to one or more targets specified by the mov instruction. The add instruction is used to add the two operands provided as part of this instruction. In addition, there are other instructions that illustrate the conversion of a control loop into predicated data flow instructions. The tlei p0, t4, 99 instruction is a "test less than or equal immediate" instruction. As part of this instruction, the operand value of the instruction is compared with an immediate value (e.g., 99) and if the operand value is less than or equal to the immediate value, then a true value is produced; otherwise, a false value is produced. The bro_t<p0> blk1 instruction is a "branch with offset" instruction predicated on the result of the tlei instruction being a true value. Similarly, the bro_f<p0> blk2 instruction is a "branch with offset" instruction predicated on the result of the tlei instruction being a false value. Thus, if the result of the tlei instruction is a true value, then the instruction bro_t<p0> blk1 will be executed. Alternatively, if the result of the tlei instruction is a false value, then the bro_$_{f<p}$0> blk2 will be executed. In the example shown above, truncated headers are used to illustrate one way of communicating ready state information. As an example, the first truncated header for the first group of instructions of block blk0 includes three bits for the pre-computed READY STATE field [010]. These three bits indicate that the first two instructions (movi followed by another movi) after the group header are ready to be scheduled for execution before even being decoded. Similarly, the second truncated header for the second group of instructions of block bkl1 includes three bits for the pre-computed READY STATE field [010]. There three bits indicate that the first two instructions (read followed by another read) are ready to be scheduled for execution before even being decoded.

Additional pre-computed ready state information may be provided regarding the readiness of the instructions in this example. As an example, information could be added to the group headers to communicate more information regarding the readiness of the other instructions in this example. As an example, the pre-computed READY STATE field may include at least four ready bits for each of the instructions shown in this example. The ready bits could be arranged as four bits [RT, RF, R0, R1] for each instruction. If set to 0, the R0 bit may indicate that the instruction awaits operand #0 as an input. If set to 0, the R1 bit may indicate that the instruction awaits operand #1 as an input. If set to 0, the RT bit may indicate that the instruction awaits the true predicate. Similarly, if set to 0, the RF bit may indicate that the instruction awaits the false predicate. Thus, the four bit vector for the ADD instruction may be [RT=1, RF=1, R0=0, R1=0] because it awaits operand #0 and operand #1. As noted above, the bro_t<p0> blk1 instruction is a "branch with offset" instruction predicated on the result of the tlei instruction being a true value. Similarly, the bro_$_{f<p}$0> blk2 instruction is a "branch with offset" instruction predicated on the result of the tlei instruction being a false value. The pre-computed READY STATE bits for the bro_t<p0> blk1 instruction may be [RT=0, RF=1, R0=1, R1=1] because it awaits only the true predicate. The pre-computed READY STATE bits for the bro_$_{f<p}$0> blk1 instruction may be [RT=1, RF=0, R0=1, R1=1] because it awaits only the false predicate.

With continued reference to FIG. 4, in step 404, compiler may store the ready state information (e.g., as shown in the exemplary group headers above) for subsequent processing by a processor, such as processor 100. The ready state information may include valid bits, where each of the valid bits may include information indicating a readiness of an input to at least one instruction of the subset of the instructions. As an example, the subsequent processing may include the steps described with respect to FIGS. 2 and 3, respectively.

In conclusion, a method including, fetching a group of instructions, wherein the group of instructions is configured to execute atomically by a processor, is provided. The method may further include scheduling at least one of the group of instructions for execution by the processor before decoding the at least one of the group of instructions based at least on pre-computed ready state information associated with the at least one of the group of instructions. In this method, the pre-computed ready state information may include at least one of: (1) a ready bit associated with the at least one of the group of instructions, (2) a number of instructions preceded by a group header for the group of instructions that can be scheduled for execution by the processor before decoding, (3) a plurality of valid bits, wherein each of the plurality of valid bits comprises information indicating a readiness of an input to the at least one of the group of instructions, (4) at least one bit indicating whether a predicate associated with the at least one of the group of instructions needs evaluation, (5) a plurality of valid bits, wherein each of the plurality of valid bits comprises information about at least one broadcast channel that the at least one of the group of instructions may monitor to receive an input via the broadcast channel, (6) information identifying specific instructions that can be executed by the processor before decoding, or (7) a bit vector such that a logic state associated with each bit in the bit vector comprises information identifying instructions that can be executed by the processor before decoding.

In addition, a processor including means for: (1) processing pre-computed ready state information for at least one of a group of instructions, wherein the group of instructions is configured to execute atomically by the processor, and (2) scheduling the at least one of the group of instructions for execution by the processor, before at least one of fetching or decoding the at least one of the group of instructions, based at least on the pre-computed ready state information associated with the at least one of the group of instructions, is provided. As an example, the means for processing and scheduling may be instruction scheduler 130 of FIG. 1. In this processor, the pre-computed ready state information may be at least one of: (1) a ready bit associated with the at least one of the group of instructions, (2) a value indicative of instructions that can be scheduled for execution by the processor before at least one of fetching or decoding the instructions, (3) a plurality of valid bits, wherein each of the plurality of valid bits comprises information indicating a readiness of an input to the at least one of the group of instructions, (4) at least one bit indicating whether a predicate associated with the at least one of the group of instructions needs evaluation. In one exemplary processor, the plurality of valid bits may include: (1) at least a first bit indicating a readiness of a left operand input to the at least one of the group of instructions and (2) at least a second bit indicating a readiness of a right operand input to the at least one of the group of instructions.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with the examples described in this disclosure can also include instructions stored in a non-transitory media, e.g., instruction cache 104 or other types of non-transitory media. The term "non-transitory media" as used herein refers to any media storing data and/or instructions that cause a machine, such as processor 100, to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine, such as processor 100. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
fetching a group of instructions, wherein the group of instructions is configured to execute atomically by a processor; and
scheduling at least one of the group of instructions for execution by the processor before decoding the at least one of the group of instructions based at least on precomputed ready state information associated with the at least one of the group of instructions, wherein the pre-computed ready state information is generated by a compiler, before the fetching of the group of instructions, during compiling of a set of instructions to provide the group of instructions for processing by the processor, and wherein the pre-computed ready state information comprises information indicating, to a scheduler: (1) whether a first instruction in the at least one of the group of instructions awaits a first operand as an input, a second operand as an input, or both the first operand and the second operand as an input and (2) whether a second instruction in the at least one group of instructions awaits a false predicate as an input or a true predicate as an input.

2. The method of claim 1, wherein the pre-computed ready state information comprises a ready bit associated with the at least one of the group of instructions.

3. The method of claim 1, wherein the pre-computed ready state information comprises a number of instructions preceded by a group header for the group of instructions that can be scheduled for execution by the processor before decoding.

4. The method of claim 1, wherein the pre-computed ready state information comprises a plurality of valid bits, wherein each of the plurality of valid bits comprises information indicating a readiness of an input to the at least one of the group of instructions.

5. The method of claim 4, wherein the plurality of valid bits comprises: (1) at least a first bit indicating a readiness of a left operand input to the at least one of the group of instructions and (2) at least a second bit indicating a readiness of a right operand input to the at least one of the group of instructions.

6. The method of claim 1, wherein the pre-computed ready state information comprises at least one bit indicating whether a predicate associated with the at least one of the group of instructions needs evaluation.

7. The method of claim 1, wherein the pre-computed ready state information comprises a plurality of valid bits, wherein each of the plurality of valid bits comprises information about at least one broadcast channel that the at least one of the group of instructions may monitor to receive an input via the broadcast channel.

8. The method of claim 1, wherein the pre-computed ready state information comprises information identifying specific instructions that can be executed by the processor before decoding.

9. The method of claim 1, wherein the pre-computed ready state information comprises a bit vector such that a logic state associated with each bit in the bit vector comprises information identifying instructions that can be executed by the processor before decoding.

10. A processor comprising:
an instruction scheduler configured to:
(1) process pre-computed ready state information for at least one of a group of instructions, wherein the group of instructions is configured to execute atomically by the processor, and
(2) schedule the at least one of the group of instructions for execution by the processor, before at least one of fetching or decoding the at least one of the group of instructions, based at least on the pre-computed ready state information for the at least one of the group of instructions, wherein the pre-computed ready state information is generated by a compiler, before the fetching of the group of instructions, during compiling of a set of instructions to provide the group of instructions for processing by the processor, and wherein the pre-computed ready state information comprises information indicating, to a scheduler: (1) whether a first instruction in the at least one of the group of instructions awaits a first operand as an input, a second operand as an input, or both the first operand and the second operand as an input and (2) whether a second instruction in the at least one group of instructions awaits a false predicate as an input or a true predicate as an input.

11. The processor of claim 10, wherein the pre-computed ready state information comprises a ready bit associated with the at least one of the group of instructions.

12. The processor of claim 10, wherein the pre-computed ready state information comprises a value indicative of instructions that can be scheduled for execution by the processor before at least one of fetching or decoding the instructions.

13. The processor of claim 10, wherein the pre-computed ready state information comprises a plurality of valid bits, wherein each of the plurality of valid bits comprises information indicating a readiness of an input to the at least one of the group of instructions.

14. The processor of claim 13, wherein the plurality of valid bits comprises: (1) at least a first bit indicating a readiness of a left operand input to the at least one of the group of instructions and (2) at least a second bit indicating a readiness of a right operand input to the at least one of the group of instructions.

15. The processor of claim 10, wherein the pre-computed ready state information comprises at least one bit indicating whether a predicate associated with the at least one of the group of instructions needs evaluation.

16. The processor of claim 10, wherein the pre-computed ready state information comprises a plurality of valid bits, wherein each of the plurality of valid bits comprises information about at least one broadcast channel that the at least one of the group of instructions may monitor to receive an input via the broadcast channel.

17. The processor of claim 10, wherein the pre-computed ready state information comprises information identifying instructions that can be executed by the processor before at least one of fetching or decoding the instructions.

18. The processor of claim 10, wherein the pre-computed ready state information comprises a bit vector such that a logic state associated with each bit in the bit vector comprises information identifying instructions that can be executed by the processor before at least one of fetching or decoding the instructions.

19. A method comprising:
using a compiler, processing instructions in a high-level language to generate at least one group of instructions, wherein the group of instructions is configured to execute atomically by a processor, and wherein the processing further comprises generating ready state information associated with a subset of the at least one group of instructions such that the subset of the instructions can be scheduled for execution by the processor without at least one of fetching or decoding the subset of the instructions, wherein the ready state information comprises information indicating, to a scheduler: (1) whether a first instruction in the at least one of the group of instructions awaits a first operand as an input, a second operand as an input, or both the first operand and the second operand as an input and (2) whether a second instruction in the at least one group of instructions awaits a false predicate as an input or a true predicate as an input; and
storing the ready state information for subsequent processing by the processor.

20. The method of claim 19, wherein the ready state information comprises a plurality of valid bits, wherein each of the plurality of valid bits comprises information indicating a readiness of an input to at least one instruction of the subset of the instructions.

* * * * *